(12) United States Patent
Ling et al.

(10) Patent No.: US 10,331,935 B2
(45) Date of Patent: Jun. 25, 2019

(54) OPTICAL FINGERPRINT MODULE

(71) Applicant: SHANGHAI OXI TECHNOLOGY CO., LTD, Shanghai (CN)

(72) Inventors: Yan Ling, Shanghai (CN); Hong Zhu, Shanghai (CN)

(73) Assignee: SHANGHAI OXI TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 15/773,255

(22) PCT Filed: Jun. 9, 2017

(86) PCT No.: PCT/CN2017/087644
§ 371 (c)(1),
(2) Date: May 3, 2018

(87) PCT Pub. No.: WO2018/145378
PCT Pub. Date: Aug. 16, 2018

(65) Prior Publication Data
US 2019/0073508 A1 Mar. 7, 2019

Related U.S. Application Data

(63) Continuation of application No. PCT/CN2017/087644, filed on Jun. 9, 2017.

(30) Foreign Application Priority Data

Feb. 9, 2017 (CN) .......................... 2017 1 0071282

(51) Int. Cl.
*G06K 9/00* (2006.01)
*H04N 5/369* (2011.01)
(52) U.S. Cl.
CPC ....... *G06K 9/0004* (2013.01); *G06K 9/00053* (2013.01); *H04N 5/369* (2013.01)

(58) Field of Classification Search
CPC ......... G06K 9/0004; G06K 9/00; G06F 3/044
See application file for complete search history.

(56) References Cited

U.S. PATENT DOCUMENTS

2008/0219522 A1  9/2008 Hook
2010/0013961 A1  1/2010 Lee
(Continued)

FOREIGN PATENT DOCUMENTS

CN   104021374 A   9/2014
CN   105184248 A   12/2015
(Continued)

OTHER PUBLICATIONS

International Search Report and Written Opinion from PCT/CN2017/087644 dated Nov. 6, 2017, with English Translation of Written Opinion.

*Primary Examiner* — Edward Park
(74) *Attorney, Agent, or Firm* — Adsero IP

(57) ABSTRACT

An optical fingerprint module includes: an optical fingerprint sensor, wherein the optical fingerprint sensor includes at least one pixel region where photosensitive pixels are disposed; each of the photosensitive pixels includes an optical fingerprint sensing device, a non-opaque region and an opaque region, wherein the optical fingerprint sensing device is disposed in the opaque region, and all the optical fingerprint devices are arranged in rows and columns; and at least one point-shaped backlight source, wherein each of the at least one pixel region corresponds to one of the at least one point-shaped backlight source; in the pixel region, a largest square region whose center is closest to the corresponding point-shaped backlight source is selected, and optical fingerprint sensing devices are divided into different device groups, and optical fingerprint sensing devices in
(Continued)

different device groups are set differently, which improves performance of the optical fingerprint module.

18 Claims, 9 Drawing Sheets

(56) References Cited

U.S. PATENT DOCUMENTS

| | | | |
|---|---|---|---|
| 2017/0262686 A1 | 9/2017 | Gao | |
| 2018/0151122 A1* | 5/2018 | Ding | G06K 9/00993 |
| 2018/0314872 A1* | 11/2018 | Ding | G06K 9/0004 |
| 2019/0012513 A1* | 1/2019 | Mainguet | G06K 9/0004 |

FOREIGN PATENT DOCUMENTS

| | | |
|---|---|---|
| CN | 205656407 U | 10/2016 |
| CN | 106298856 A | 1/2017 |

* cited by examiner

OPTICAL FINGERPRINT MODULE

CROSS-REFERENCE TO RELATED APPLICATIONS

This application is the national phase of International Application No. PCT/CN2017/087644, filed on Jun. 9, 2017, which claims the benefit of priority to Chinese Patent Application No. 201710071282.8, filed on Feb. 9, 2017, and entitled "OPTICAL FINGERPRINT MODULE", the entire disclosure of which are incorporated herein by reference.

TECHNICAL FIELD

The present disclosure generally relates to a photoelectric display field, and more particularly, to an optical fingerprint module.

BACKGROUND

Fingerprint imaging recognition technology is used to realize identification by capturing fingerprint images of a person using optical fingerprint sensors or modules and then determining whether the fingerprint image information matches that already stored in a system. Due to its convenience in use and uniqueness of human fingerprints, the fingerprint recognition technology has been widely applied to various fields, such as security inspection field including Public Security Bureau (PSB) or customs, access control systems of buildings, consumption goods field including personal computers or mobile phones and the like. The fingerprint recognition technology may be realized by optical imaging, capacitance imaging, ultrasound imaging and so on, among which, the optical fingerprint recognition technology is advantageous in imaging quality and device cost.

More information on optical fingerprint modules can be referred to the Chinese Utility Model Patent with a publication No. CN203405831U.

However, structures and performance of the existing optical fingerprint modules still remain to be improved.

SUMMARY

An optical fingerprint module is provided according to embodiments of the present disclosure to improve performance of the existing optical fingerprint modules.

An optical fingerprint module is provided, and the optical fingerprint module may include: an optical fingerprint sensor, wherein the optical fingerprint sensor includes at least one pixel region where photosensitive pixels are disposed; each of the photosensitive pixels includes an optical fingerprint sensing device, a non-opaque region and an opaque region, wherein the optical fingerprint sensing device is disposed in the opaque region, and all the optical fingerprint devices are arranged in rows and columns; and at least one point-shaped backlight source, wherein each of the at least one pixel region corresponds to one of the at least one point-shaped backlight source, and the point-shaped backlight source is disposed obliquely below the optical fingerprint sensing devices in an outermost row of the corresponding pixel region; in the pixel region, a largest square region whose center is closest to the corresponding point-shaped backlight source is selected, wherein the largest square region includes 2x×2x pieces of the optical fingerprint sensing devices, or (2x+1)×(2x+1) pieces of the optical fingerprint sensing devices, wherein x is an integer greater than 2; in the largest square region, two rows and two columns of the optical fingerprint sensing devices farthest from the corresponding point-shaped backlight source are defined as an $x^{th}$ device group, and two rows and two columns of the optical fingerprint sensing devices secondly farthest from the corresponding point-shaped backlight source are defined as an $(x-1)^{th}$ device group, and other optical fingerprint sensing devices in the largest square region are set in a same manner, until the remaining optical fingerprint sensing devices are defined as a first device group; and the optical fingerprint sensing devices in a $y^{th}$ device group and the optical fingerprint sensing devices in a $(y+1)^{th}$ device group correspond to at least one of the following two cases, wherein y is an integer from 1 to x: in a first case, an effective photosensitive area of the optical fingerprint sensing devices in the $y^{th}$ device group is smaller than an effective photosensitive area of the optical fingerprint sensing devices in the $(y+1)^{th}$ device group; or in a second case, an area of the non-opaque region around the optical fingerprint sensing devices in the $y^{th}$ device group is smaller than an area of the non-opaque region around the optical fingerprint sensing devices in the $(y+1)^{th}$ device group.

In some embodiment, in the first case, a photosensitive area of the optical fingerprint sensing devices in the $y^{th}$ device group is smaller than a photosensitive area of the optical fingerprint sensing devices in the $(y+1)^{th}$ device group, and the photosensitive area is equal to the effective photosensitive area, so that the effective photosensitive area of the optical fingerprint sensing devices in the $y^{th}$ device group is smaller than the effective photosensitive area of the optical fingerprint sensing devices in the $(y+1)^{th}$ device group.

In some embodiment, in the first case, photosensitive areas of the optical fingerprint sensing devices are the same, a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group, so that the effective photosensitive area of the optical fingerprint sensing devices in the $y^{th}$ device group is smaller than the effective photosensitive area of the optical fingerprint sensing devices in the $(y+1)^{th}$ device group.

In some embodiment, in the second case, photosensitive areas of the optical fingerprint sensing devices are the same.

In some embodiment, in the first case or in a condition in which both the first case and the second case exist, a photosensitive area of the optical fingerprint sensing devices in the $y^{th}$ device group is smaller than a photosensitive area of the optical fingerprint sensing devices in the $(y+1)^{th}$ device group, and a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group.

In some embodiment, in the pixel region, there are remaining A rows of the optical fingerprint sensing devices disposed outside the largest square region, wherein A is an integer greater than 1; in the A rows of the optical fingerprint sensing devices, a row of the optical fingerprint sensing devices closet to the point-shaped backlight source is defined as an $(x+1)^{th}$ device group, and other optical fingerprint sensing devices in the remaining A rows are set in a same manner, until a row of the optical fingerprint sensing device farthest from the point-shaped backlight source are defined as an $(x+a)^{th}$ device group; or, in the pixel region, there are remaining 2A columns of the optical fingerprint sensing devices symmetrically disposed on both sides of the largest square region, wherein A is an integer greater than 1; in the 2A columns of the optical fingerprint sensing devices, two columns of the optical fingerprint sensing devices closest to the point-shaped backlight source are defined as an $(x+1)^{th}$ device group, and other optical fingerprint sensing devices in the remaining 2A columns are set in a same manner, until two columns of the optical fingerprint sensing devices farthest from the point-shaped backlight source are defined as an $(x+a)^{th}$ device group; and the optical fingerprint sensing devices in the $z^{th}$ device group and the optical fingerprint sensing devices in the $(z+1)^{th}$ device group correspond to at least one of the following two cases, wherein z is an integer from x to x+a: in the first case, an effective photosensitive area of the optical fingerprint sensing devices in the $z^{th}$ device group is smaller than an effective photosensitive area of the optical fingerprint sensing devices in the $(z+1)^{th}$ device group; in the second case, an area of the non-opaque region around the optical fingerprint sensing devices in the $z^{th}$ device group is smaller than an area of the non-opaque region around the optical fingerprint sensing devices in the $(z+1)^{th}$ device group.

An optical fingerprint module is provided, and the optical fingerprint module may include: an optical fingerprint sensor, wherein the optical fingerprint sensor includes at least one pixel region where photosensitive pixels are disposed; each of the photosensitive pixels includes an optical fingerprint sensing device, a non-opaque region and an opaque region, wherein the optical fingerprint sensing device is disposed in the opaque region, and all the optical fingerprint devices are arranged in rows and columns; and at least one point-shaped backlight source, wherein each of the at least one pixel region corresponds to one of the at least one point-shaped backlight source, and the point-shaped backlight source is disposed obliquely below the optical fingerprint sensing devices in an outermost row of the corresponding pixel region; in the pixel region, a largest rectangular region whose center is closest to the corresponding point-shaped backlight source is selected, wherein the largest rectangular region includes x×(2x−1) pieces of the optical fingerprint sensing devices with a form of x rows and (2x−1) columns, or includes x×2x pieces of the optical fingerprint sensing devices with a form of x rows and (2x−1), wherein x is an integer greater than 2; in the largest rectangular region, one row and two columns of the optical fingerprint sensing devices farthest from the corresponding point-shaped backlight source are defined as an $x^{th}$ device group, and one row and two columns of the optical fingerprint sensing devices secondly farthest from the corresponding point-shaped backlight source are defined as an $(x-1)^{th}$ device group, and other optical fingerprint sensing devices in the largest square region are set in a same manner, until the remaining optical fingerprint sensing devices are defined as a first device group; and the optical fingerprint sensing devices in a $y^{th}$ device group and the optical fingerprint sensing devices in a $(y+1)^{th}$ device group correspond to at least one of the following two cases, wherein y is an integer from 1 to x: in a first case, an effective photosensitive area of the optical fingerprint sensing devices in the $y^{th}$ device group is smaller than an effective photosensitive area of the optical fingerprint sensing devices in the $(y+1)^{th}$ device group; or in a second case, an area of the non-opaque region around the optical fingerprint sensing devices in the $y^{th}$ device group is smaller than an area of the non-opaque region around the optical fingerprint sensing devices in the $(y+1)^{th}$ device group.

In some embodiment, in the first case, a photosensitive area of the optical fingerprint sensing devices in the $y^{th}$ device group is smaller than a photosensitive area of the optical fingerprint sensing devices in the $(y+1)^{th}$ device group, and the photosensitive area is equal to the effective photosensitive area, so that the effective photosensitive area of the optical fingerprint sensing devices in the $y^{th}$ device group is smaller than the effective photosensitive area of the optical fingerprint sensing devices in the $(y+1)^{th}$ device group.

In some embodiment, in the first case, photosensitive areas of the optical fingerprint sensing devices are the same, a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group, so that the effective photosensitive area of the optical fingerprint sensing devices in the $y^{th}$ device group is smaller than the effective photosensitive area of the optical fingerprint sensing devices in the $(y+1)^{th}$ device group.

In some embodiment, in the second case, photosensitive areas of the optical fingerprint sensing devices are the same.

In some embodiment, in the first case or in a condition in which both the first case and the second case exist, a photosensitive area of the optical fingerprint sensing devices in the $y^{th}$ device group is smaller than a photosensitive area of the optical fingerprint sensing devices in the $(y+1)^{th}$ device group, and a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group.

In some embodiment, in the pixel region, there are remaining A rows of the optical fingerprint sensing devices disposed outside the largest rectangular region, wherein A is an integer greater than 1; in the A rows of the optical fingerprint sensing devices, a row of the optical fingerprint sensing devices closet to the point-shaped backlight source is defined as an $(x+1)^{th}$ device group, and other optical fingerprint sensing devices in the remaining A rows are set in a same manner, until a row of the optical fingerprint sensing device farthest from the point-shaped backlight source are defined as an $(x+a)^{th}$ device group; or, in the pixel region, there are remaining 2A columns of the optical fingerprint sensing devices symmetrically disposed on both sides of the largest rectangular region, wherein A is an integer greater than 1; in the 2A columns of the optical fingerprint sensing devices, two columns of the optical fingerprint sensing devices closest to the point-shaped backlight source are defined as an $(x+1)^{th}$ device group, and other optical fingerprint sensing devices in the remaining 2A columns are set in a same manner, until two columns of the optical fingerprint sensing devices farthest from the point-shaped backlight source are defined as an $(x+a)^{th}$ device group; and the optical fingerprint sensing devices in the $z^{th}$ device group and the optical fingerprint sensing devices in the $(z+1)^{th}$ device group correspond to at least one of the following two cases, wherein z is an integer from x to x+a: in the first case, an effective photosensitive area of the optical fingerprint sensing devices in the $z^{th}$ device group is smaller than an effective photosensitive area of the optical fingerprint sensing devices in the $(z+1)^{th}$ device group; in the second case, an area of the non-opaque region around the optical fingerprint sensing devices in the $z^{th}$ device group is smaller than an area of the non-opaque region around the optical fingerprint sensing devices in the $(z+1)^{th}$ device group.

An optical fingerprint module is provided, and the optical fingerprint module may include: an optical fingerprint sensor, wherein the optical fingerprint sensor includes at least one pixel region where photosensitive pixels are disposed; each of the photosensitive pixels includes an optical fingerprint sensing device, a non-opaque region and an opaque region, wherein the optical fingerprint sensing device is disposed in the opaque region; and a point-shaped backlight source, wherein one of the pixel region corresponds to one of the point-shaped backlight sources; the point-shaped backlight source is obliquely below the corresponding pixel region; wherein the pixel region is divided into a plurality of light intensity regions sequentially from a first light intensity region to an $x^{th}$ light intensity region according to a distance relative to the corresponding point-shaped backlight source, from a shortest distance to a longest distance, wherein a whole shape of a second light intensity region to an $(x-1)^{th}$ light intensity region presents an arc-shaped bar or an elliptical arc-shaped bar, wherein x is an integer greater than 3; and the optical fingerprint sensing devices in the first light intensity region are defined as a first device group and the optical fingerprint sensing devices in the second light intensity region are defined as a second device group, and the optical fingerprint sensing devices in the $x^{th}$ light intensity region are defined as an $x^{th}$ device group; and the optical fingerprint sensing devices in the $y^{th}$ device group and the optical fingerprint sensing devices in the $(y+1)^{th}$ device group correspond to at least one of the following two cases, wherein y is an arbitrary integer from 1 to x: in a first case, an effective photosensitive area of the optical fingerprint sensing devices in the $y^{th}$ device group is smaller than an effective photosensitive area of the optical fingerprint sensing devices in the $(y+1)^{th}$ device group; or in a second case, an area of the non-opaque region around the optical fingerprint sensing devices in the $y^{th}$ device group is smaller than an area of the non-opaque region around the optical fingerprint sensing devices in the $(y+1)^{th}$ device group.

In some embodiment, in the first case, a photosensitive area of the optical fingerprint sensing devices in the $y^{th}$ device group is smaller than a photosensitive area of the optical fingerprint sensing devices in the $(y+1)^{th}$ device group, and the photosensitive area is equal to the effective photosensitive area, so that the effective photosensitive area of the optical fingerprint sensing devices in the $y^{th}$ device group is smaller than the effective photosensitive area of the optical fingerprint sensing devices in the $(y+1)^{th}$ device group.

In some embodiment, in the first case, all photosensitive areas of the optical fingerprint sensing devices are the same, and the optical fingerprint sensing device has a light blocking layer above, and the light blocking layer has an opening for exposing a surface of the optical fingerprint sensing device; an opening area of the light blocking layer above the optical fingerprint sensing devices in the $y^{th}$ device group is smaller than an opening area of the light blocking layer above the optical fingerprint sensing devices in the $(y+1)^{th}$ device group, so that the effective photosensitive area of the optical fingerprint sensing devices in the $y^{th}$ device group is smaller than the effective photosensitive area of the optical fingerprint sensing devices in the $(y+1)^{th}$ device group.

In some embodiment, in the second case, photosensitive areas of the optical fingerprint sensing devices are the same.

In some embodiment, in the first case or in a condition in which both the first case and the second case exist, a photosensitive area of the optical fingerprint sensing devices in the $y^{th}$ device group is smaller than a photosensitive area of the optical fingerprint sensing devices in the $(y+1)^{th}$ device group, and a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group.

In some embodiment, when one optical fingerprint sensing device is disposed in two different light intensity regions, the optical fingerprint sensing device is regarded as being disposed in one of the two light intensity regions where a larger portion of the optical fingerprint sensing device is disposed; and when one optical fingerprint sensing device is disposed in two different light intensity regions, and areas of the optical fingerprint sensing device disposed in the two different light intensity regions are the same, the optical fingerprint sensing device is regarded as being disposed in any one of the two different light intensity regions.

Compared with the prior art, embodiments of the present disclosure have the following advantages.

In the embodiments of the present disclosure, the optical fingerprint sensing devices are treated differently to ensure that the optical fingerprint sensing devices in different positions receive roughly the same fingerprint signals, so as to improve quality of fingerprint images the optical fingerprint module obtains.

DETAILED DESCRIPTION

As described in the background, the performance of the existing optical fingerprint module needs to be improved.

Therefore, a new optical fingerprint module is provided. In the optical fingerprint module, optical sensing devices in pixel regions are divided into different device groups (the division of different device groups adopts a non-linear variant rule), and different device groups are treated according to different cases, so that differences of fingerprint signals received by the optical sensing devices in different locations are reduced, and quality of obtained fingerprint images are improved, which may improve a fingerprint identification function of the optical fingerprint module.

The foregoing objects, features and advantages of the present disclosure will become more apparent from the following detailed description of specific embodiments in conjunction with the accompanying drawings.

The upper and lower location relationship in the present disclosure is defined by placing the optical fingerprint module under a user's eyes. That is to say, in the optical fingerprint module, if it is mentioned that one structure is disposed above another structure, it means that the one structure is closer to the user's eyes than another structure when the optical fingerprint module is placed under the user's eyes. In addition, an area of each structure mentioned in the present disclosure refers to an area in a top view under the upper and lower location relationship described above.

Figure 1:
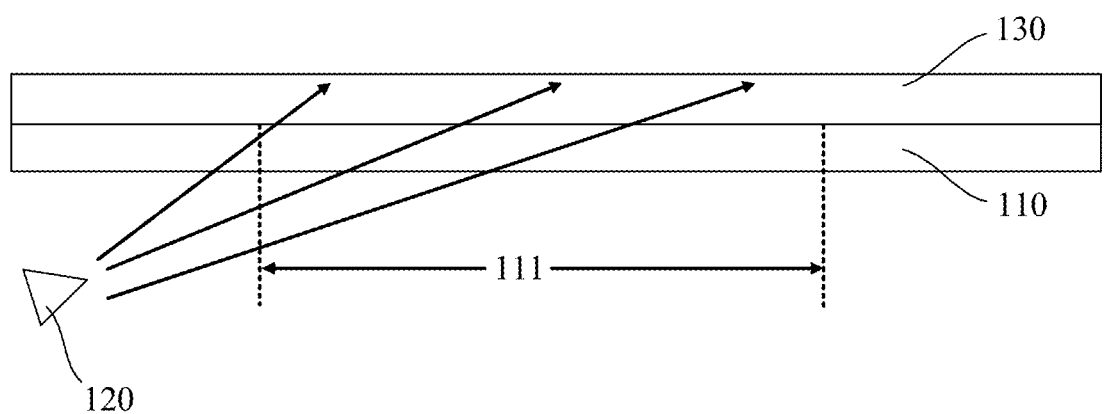
FIG. 1 schematically illustrates a cross-sectional view of an optical fingerprint module according to an embodiment.

In an embodiment of the present disclosure, an optical fingerprint module is provided. Referring to FIG. 1, FIG. 1 is a cross-sectional view of the optical fingerprint module. The optical fingerprint module includes a protective layer 130, an optical fingerprint sensor 110, and a point-shaped backlight source 120.

In FIG. 1, the optical fingerprint sensor 110 includes a pixel region 111 where photosensitive pixels (not shown, with reference to subsequent corresponding content) are disposed. In general, the optical fingerprint sensor 110 includes a non-opaque substrate (not shown, reference may be made to a subsequent non-opaque substrate 112) and a device layer (not shown, with reference to subsequent corresponding content) on a surface of the non-opaque substrate. The optical fingerprint sensor 110 includes the pixel region 111, that is, the device layer includes the pixel region 111.

In some embodiment, the pixel region 111 is rectangular, and a size of the pixel region 111 may be selected according to product requirement. The pixel region 111 includes a plurality of photosensitive pixels. Each of the photosensitive pixels includes an optical fingerprint sensing device (typically, each photosensitive pixel includes one optical fingerprint-sensing device), a non-opaque region and an opaque region, wherein the optical fingerprint sensing device is disposed in the opaque region. All the optical fingerprint sensor devices are arranged in rows and columns.

It should be noted that, in some embodiment, the opaque region is not entirely opaque for the entire region from top to bottom. Instead, the bottom of the opaque region includes an opaque layer, so that the optical fingerprint sensing devices disposed above the opaque layer may be protected by the opaque layer from being affected by light propagating upward. However, in the opaque region, a structure above the optical fingerprint sensing device is still non-opaque, so that the optical fingerprint sensing device may receive light from above.

It should be noted that, in some embodiment, a light blocking layer may be further disposed above the device layer to block incident light, that is, a size of the non-opaque region may be adjusted by the opaque region. In this case, the non-opaque region may be defined by a lower opaque layer and an upper light blocking layer together. All regions where any structures having the opaque layer or the light blocking layer are disposed belong to the opaque region.

It should be noted that, in some embodiment, height of the non-opaque region is equal to height of the device layer, that is, the non-opaque region is a non-opaque structure from the bottom to the top, so that light can pass through the device layer from the non-opaque region (it should be noted that the height of each position of the device layer may be slightly different, but the height of the device layer in at least a part of positions is equal to the height of the corresponding non-opaque region). And light may pass through the device layer from the non-opaque region, which ensures that the optical fingerprint module may use the point-shaped backlight source 120 disposed under the optical fingerprint sensor 110 to acquire a fingerprint image.

In FIG. 1, the pixel region 111 is labeled between two long dashed lines, which represents that in a plane where the cross-section shown in FIG. 1 is disposed, the pixel region 111 is disposed between two long dashed lines of the optical fingerprint sensor 110, and more specifically, the pixel region 111 is disposed in each layer structure between two long dashed lines in the optical fingerprint sensor 110. Moreover, the region between the two dashed lines below the optical fingerprint sensor 110 is a region rightly under the pixel region 111. In cross-sectional schematic diagrams corresponding to other embodiments in the present disclosure, the labeling of the corresponding pixel region is also performed by the above method, which is hereby described.

FIG. 1 shows that the protective layer 130 is disposed above the optical fingerprint sensor 110 for protecting the optical fingerprint sensor 110. In some embodiment, the protective layer 130 is a single layer. It should be noted that, in some embodiment, the protective layer 130 may further be a multi-layer structure, and a light filtering layer is disposed on at least one of an upper surface of the protective layer 130, a lower surface of the protective layer 130 and an upper surface of the optical fingerprint sensor 110.

In some embodiment, each pixel region corresponds to one point-shaped backlight source. And, the point-shaped backlight source is obliquely below the optical fingerprint sensing devices in the outermost row of the corresponding pixel region. Specially, as shown in FIG. 1, the point-shaped backlight source 120 is disposed below the pixel region 111. Therefore, an angle formed by light emitted from the point-shaped backlight source 120 and the upper surface of the protective layer 130 is an acute angle. The light emitted by the point-shaped backlight source 120 is shown by the black unidirectional arrow in FIG. 1. Because the point-shaped backlight source 120 is disposed below the pixel region 111, the point-shaped backlight source 120 is disposed at one side of the pixel region 111. In the cross-sectional view shown in FIG. 1, the region rightly under the pixel region 111 is a region between the two long dashed lines, and the point-shaped backlight source 120 falls outside this region. Therefore, in FIG. 1, the point-shaped backlight source 120 is disposed below the pixel region 111, and it is easy to understand that the "below" means "outboard below" or the "below" means "obliquely below".

In some embodiment, the point-shaped backlight source 120 may be an LED, the light of the LED (emitted) may be near-ultraviolet light, violet light, blue light, green light, yellow light, red light, near-infrared light or white light.

Although not shown in the figures, in some embodiment, a first optical adhesive layer may be disposed between the optical fingerprint sensor 110 and the protective layer 130, and the device layer is disposed between the non-opaque substrate (not shown) and the protective layer (the first optical adhesive layer is disposed between the device layer and the protective layer 130). The light emitted by the point-shaped backlight source 120 passes through the non-opaque substrate, then passes through the device layer from the non-opaque region, then enters the first optical adhesive layer, and then enters the protective layer 130 from the first optical adhesive layer.

It should be noted that, in some embodiment, the first optical adhesive layer may also be disposed between the optical fingerprint sensor 110 and the protective layer 130. However, the non-opaque substrate is disposed between the device layer and the protective layer 130 (that is, the first optical adhesive layer is disposed between the non-opaque substrate and the protective layer 130), and the light emitted by the point-shaped backlight source 120 passes through the device layer from the non-opaque region, then passes through the non-opaque substrate, then enters the first optical adhesive layer, and then enters the protective layer 130 from the first optical adhesive layer. The first optical adhesive layer may be a thermo-sensitive optical adhesive layer, a photosensitive optical adhesive layer or an optical double-sided adhesive tape.

In the optical fingerprint module provided by an embodiment, the point-shaped backlight 120 is particularly disposed below the outer side of the pixel region 111, so that the light emitted from the point-shaped backlight 120 passes through the optical fingerprint sensor 110 (passing through the optical fingerprint sensor 110 may be passing through the non-opaque substrate and passing through the non-opaque substrate and the pixel region 111) and then reaches the protective layer 130, and the angle formed by the light and the upper surface of the protective layer 130 is an acute angle. Meanwhile, since all the light reaching the upper surface of the protective layer 130 and the upper surface of the protective layer 130 form an acute angle, the light reaching the upper surface of the protective layer 130 may usually be reflected on the interface between the upper surface of the protective layer and a finger at a corresponding shift distance, and most of the effective reflected light is radiated to the photosensitive pixels in the pixel region 111 which have substantially the same shift distance with the corresponding reflection points. Therefore, the entire optical fingerprint module may recognize a fingerprint image and form a clear fingerprint image without a light guide plate, which simplifies a structure of the optical fingerprint module, and reduces cost.

In order to realize the acquisition of fingerprint images better, in some embodiment, the optical fingerprint sensing devices in the pixel region may be improved, to treat the optical fingerprint sensing devices differently, so that the optical fingerprint sensing devices may be distinguished according to a certain rule.

The following six embodiments are provided to describe differences among the optical fingerprint sensing devices in the pixel region in conjunction with FIG. 2 to FIG. 13. In the first embodiment, referring to FIG. 2, a top view of the pixel region exactly presents a square. In the embodiment, the pixel region includes 2x×2x pieces of the optical fingerprint sensing devices, or (2x+1)×(2x+1) pieces of the optical fingerprint sensing devices, wherein x is an integer greater than 2.

In the embodiment, in the pixel region, a largest square region S1 whose center is closest to the point-shaped backlight source 120 is selected. Accordingly, the largest square region S1 is the pixel region itself. Specifically, when the pixel region includes 2x×2x pieces of the optical fingerprint sensing devices, the largest square region S1 includes 2x×2x pieces of the optical fingerprint sensing devices; when the pixel region includes (2x+1)×(2x+1) pieces of the optical fingerprint sensing devices, the largest square region S1 includes (2x+1)×(2x+1) pieces of the optical fingerprint sensing devices.

In the embodiment, in the largest square region S1, two rows and two columns of the optical fingerprint sensing devices farthest from the corresponding point-shaped backlight source are defined as an $x^{th}$ device group, and two rows and two columns of the optical fingerprint sensing devices secondly farthest from the corresponding point-shaped backlight source are defined as an $(x-1)^{th}$ device group, and other optical fingerprint sensing devices in the largest square region are set in a same manner, until the remaining optical fingerprint sensing devices are defined as a first device group.

Further, in the embodiment, the optical fingerprint sensing devices in a $y^{th}$ device group and the optical fingerprint sensing devices in a $(y+1)^{th}$ device group correspond to at least one of the following two cases, wherein y is an integer from 1 to x. In a first case, an effective photosensitive area of the optical fingerprint sensing devices in the $y^{th}$ device group is smaller than an effective photosensitive area of the optical fingerprint sensing devices in the $(y+1)^{th}$ device group. In a second case, an area of the non-opaque region around the optical fingerprint sensing devices in the $y^{th}$ device group is smaller than an area of the non-opaque region around the optical fingerprint sensing devices in the $(y+1)^{th}$ device group.

It should be noted that, the "embodiment" and the "case" are different in the disclosure, and it may seen from the present embodiment and the following five embodiments that each of the six embodiments satisfies at least one of the first case and the second case.

Figure 3:
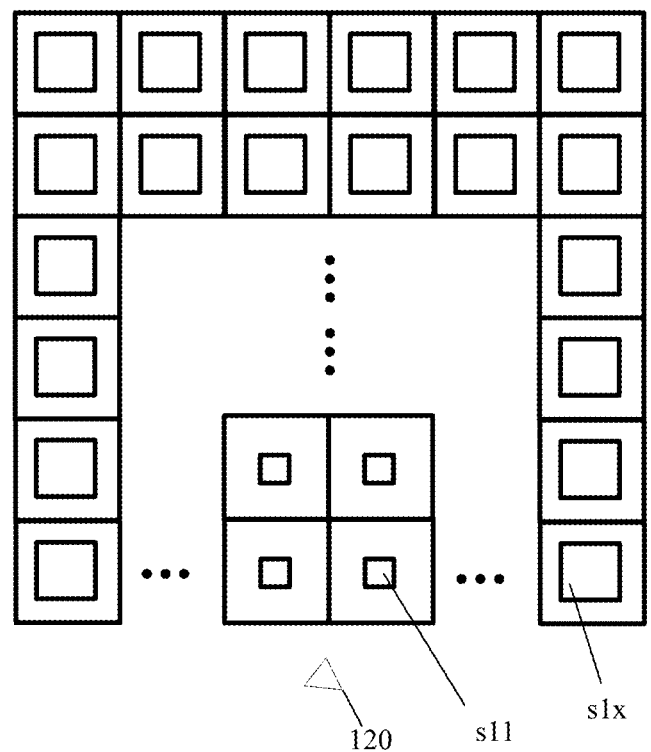
FIG. 3 schematically illustrates a diagram of photosensitive pixels in a first case according to the embodiment shown in FIG. 2.

FIG. 3 shows that in the first case, a result of specifically selecting the first case.

In FIG. 3, a plurality of photosensitive pixels arranged in rows and columns are shown (the photosensitive pixels are not labeled in FIG. 3, and all the photosensitive pixels in FIG. 3 are the same in size, as shown in each large rectangle in FIG. 3). More specifically, in the largest square region S1, two rows and two columns of the photosensitive pixels farthest from the point-shaped backlight source 120 (it should be noted that, in FIG. 3 and the subsequent corresponding figures, only two farthest rows and two farthest columns of the photosensitive pixels are shown, and therefore, there are only six photosensitive pixels in each row and each column, but this is only for the sake of clarity, and actual number of photosensitive pixels of a product may vary), and four photosensitive pixels closest from the point-shaped backlight source 120 (arranged in two rows and two columns) are shown, and dots in the figure represents some omitted photosensitive pixels.

Referring to FIG. 3, the four photosensitive pixels closest to the point-shaped backlight source 120 are the optical fingerprint sensing devices s11 in the first device group (the optical fingerprint sensing devices are shown as small rectangles in FIG. 3 and are partially labeled). And the farthest row and farthest column of photosensitive pixels include optical fingerprint sensing devices s1$x$ in the $x^{th}$ device group, wherein the area of the optical fingerprint sensing device s11 in the first device group is the smallest, which indicates that the effective photosensitive area of the optical fingerprint sensing devices in the first device group is the smallest; and the area of the optical fingerprint sensing device s1$x$ in the $x^{th}$ device group is the largest, which indicates that the effective photosensitive area of the optical fingerprint sensing devices in the $x^{th}$ device group is the largest. The reason is precisely the first case itself: an effective photosensitive area of the optical fingerprint sensing devices in the $y^{th}$ device group is smaller than an effective photosensitive area of the optical fingerprint sensing devices in the $(y+1)^{th}$ device group.

It should be noted that, in some embodiment, the effective photosensitive areas of the optical fingerprint sensing device between two adjacent device groups may have a linear variable relationship in addition to the size relationship mentioned above. For example, the effective photosensitive areas of the optical fingerprint sensing devices in the $y^{th}$ device group is c times (0<c<1) of the effective photosensitive area of the optical fingerprint sensing devices in the $(y+1)^{th}$ device group. In some embodiment, the effective photosensitive areas of the optical fingerprint sensing devices between two adjacent device groups may have other variable relationships in addition to the size relationship mentioned above. For example, the effective photosensitive areas of the optical fingerprint sensing devices in the $y^{th}$ device group and the effective photosensitive area of the optical fingerprint sensing devices in the $(y+1)^{th}$ device group correspond to ordinates (corresponding abscissas are y and y+1) of two different points on the conic (e.g. parabola).

Figure 4:
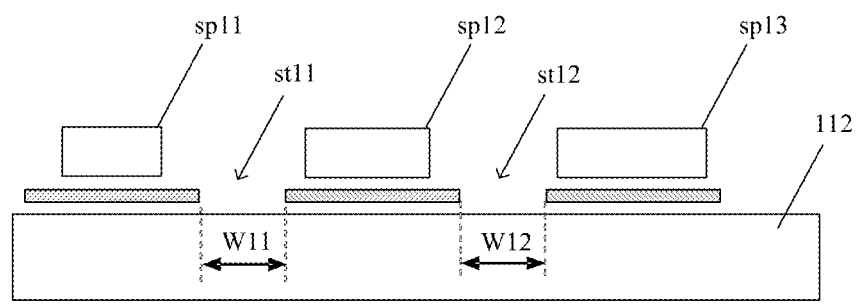
FIG. 4 schematically illustrates a cross-sectional view of a portion of the photosensitive pixels shown in FIG. 3.

Referring to FIG. 4, which illustrates a cross-sectional structure of a part of the position corresponding to the embodiment in FIG. 3. The cross-sectional structure includes three photosensitive pixels and the previously mentioned point-shaped backlight source 120 and the non-opaque substrate 112 of the optical fingerprint sensor (wherein the non-opaque substrate 112 is a lower substrate of the optical fingerprint sensor 110 in FIG. 1 which is not shown in FIG. 1, but shown in the cross-sectional structure of FIG. 4. Moreover, FIG. 7 and FIG. 10 correspondingly show the non-opaque substrate 112, which is hereby described). The three photosensitive pixels respectively include an optical fingerprint sensing device sp11, an optical fingerprint sensing device sp12 and an optical fingerprint sensing device sp13, which are all disposed on the opaque layer (not labeled). Non-opaque regions are disposed among the different opaque layers. For example, a non-opaque region st11 and a non-opaque region st12 are shown in FIG. 4. In the embodiment, the areas of the non-opaque regions in the photosensitive pixels are the same. As shown in FIG. 4, width W11 of the non-opaque region st11 and width W12 of the non-opaque region st12 are the same.

Further, referring to FIG. 4, in the first embodiment, when the first case is adopted, a photosensitive area of the optical fingerprint sensing devices in the $y^{th}$ device group is smaller than a photosensitive area of the optical fingerprint sensing devices in the $(y+1)^{th}$ device group, wherein the photosensitive area equals the effective photosensitive area, so that the effective photosensitive area of the optical fingerprint sensing devices in the $y^{th}$ device group is smaller than the effective photosensitive area of the optical fingerprint sensing devices in the $(y+1)^{th}$ device group. That is to say, in the first embodiment, the photosensitive area is not blocked by other structures, and the photosensitive area equals the effective photosensitive area. Therefore, the difference of the photosensitive areas of the optical fingerprint sensing device leads directly to the difference of the effective photosensitive areas.

Figure 2:
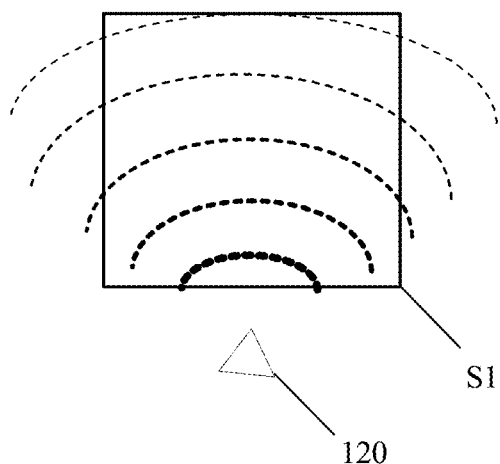
FIG. 2 schematically illustrates a top view of a pixel region according to an embodiment.

In some embodiment, the optical fingerprint sensing devices in different positions are configured to have different effective photosensitive areas, in order to make fingerprint signals received by the optical fingerprint sensing devices in different device groups substantially the same. The reason lies in that: in some embodiment, the point-shaped backlight source is used to acquire fingerprint images, and intensity of light emitted by the point-shaped backlight source (e.g. an LED) gradually decreases as a distance increases. Therefore, when the point-shaped backlight source is used as a light source, the intensity of the light finally reaching the pixel region are different, and for the optical fingerprint sensing device, the further away from the point-shaped backlight source 120, the weaker the intensity of the received light is. Each dashed line in FIG. 2 is the corresponding isocandela curves, and the closer to the point-shaped backlight source 120, the stronger the corresponding intensity of light is. In some embodiment, the effective photosensitive areas of the optical fingerprint sensing devices in different device groups are different by the above adjustment, specifically, for the optical fingerprint sensing device, the further away from the point-shaped backlight source 120, the larger the effective photosensitive area is. Accordingly, it may be seen that a variable rule of the effective photosensitive areas and a variable rule of the light intensity are exactly opposite, so that products of the two are similar, which ensures the optical fingerprint sensing devices in different positions finally can receive substantially the same fingerprint signals and improves quality of the fingerprint images obtained by the optical fingerprint module.

To further explain the above reasons, it is assumed that intensity of the incident light received by the optical fingerprint sensing devices in a photosensitive pixel is d. An equivalent optical absorption rate of the optical fingerprint sensing devices in the photosensitive pixel is o. It should be noted that this equivalent optical absorption rate o is proportional to the effective photosensitive area. The fingerprint information finally obtained by the photosensitive pixel is equal to a product of the intensity d of the incident light and the equivalent light absorption rate o.

With the premise that each photosensitive pixel has the same area of the non-opaque region, the farther the photosensitive pixel is from the point-shaped backlight source, the weaker the intensity d of incident light it receives. Therefore, in the first embodiment, the optical fingerprint sensing device farther away from the point-shaped backlight source has a larger effective photosensitive area, so that the equivalent light absorption rate o of the optical fingerprint sensing device farther away from the point-shaped backlight source is greater. With this arrangement, the products of the intensity d of the incident light and the equivalent light absorption rate o of the different optical fingerprint sensing devices are substantially equal to each other, that is, the photosensitive pixels in different positions obtain similar fingerprint information.

It should be specially noted that, for a photosensitive pixel, the incident light received by its optical fingerprint sensing device is not the light emitted from the point-shaped backlight source and passing through its own non-opaque region, but the light emitted from the point-shaped backlight source and passing through a non-opaque region of another photosensitive pixel, wherein the another photosensitive pixel is closer to the point-shaped backlight source than it. That is to say, as described above in this embodiment, the incident light from the point-shaped backlight source to the device layer is at an acute angle. Therefore, after the incident light is subsequently reflected from the upside of the device layer, the reflected light is radiated to the photosensitive pixels shifted by a certain distance, that is, the incident light received by each photosensitive pixel comes from the corresponding non-opaque region of the photosensitive pixel beyond a certain distance.

It should be noted that, in some embodiment, the effective photosensitive areas of the optical fingerprint sensing devices adjusted in the device group. For example, in the first embodiment, the optical fingerprint sensing devices in the same device group have the same effective photosensitive area. However, although the photosensitive pixels are in the same device group, the intensity of the incident light they receive is also slightly different. Therefore, for simplifying the processing, it is considered that the intensity of incident light received by each optical fingerprint sensing devices in the same device group is basically the same.

In conclusion, in the first embodiment, the photosensitive areas of the optical fingerprint sensing devices in different device groups are changed, to make the optical fingerprint sensing devices of different device groups have different effective photosensitive areas, so that the equivalent optical absorption rate o of each optical fingerprint sensing device may be adjusted. By changing the effective photosensitive areas of the optical fingerprint sensing device, the equivalent optical absorption rate o of each optical fingerprint sensing device may be adjusted, so that the photosensitive pixels (the optical fingerprint sensing device) in different positions may receive substantially the same fingerprint signal.

Figure 5:
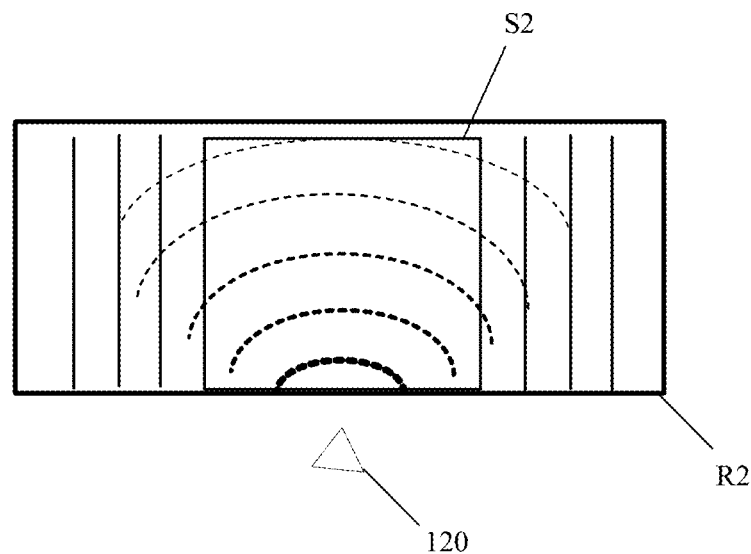
FIG. 5 schematically illustrates a top view of a pixel region according to an embodiment.

In a second embodiment, referring to FIG. 5, the top view shape of the pixel region R2 is a rectangle. In the second embodiment, in the pixel region R2, a largest square region S2 whose center is closest to the point-shaped backlight source 120 is selected. Meanwhile, there are two scenarios that the largest square region includes 2x×2x pieces of the optical fingerprint sensing devices, or includes (2x+1)×(2x+1) pieces of the optical fingerprint sensing devices, wherein x is an integer greater than 2.

In the embodiment, in the largest square region S2 selected in the same manner as the first embodiment, the $x^{th}$ device group up to the first device group are defined. Similarly, in the second embodiment, the optical fingerprint sensing devices in a $y^{th}$ device group and the optical fingerprint sensing devices in a $(y+1)^{th}$ device group correspond to at least one of the following two cases, wherein y is an arbitrary integer from 1 to x. In the first case, an effective photosensitive area of the optical fingerprint sensing devices in the $y^{th}$ device group is smaller than an effective photosensitive area of the optical fingerprint sensing devices in the $(y+1)^{th}$ device group. In the second case, an area of the non-opaque region around the optical fingerprint sensing devices in the $y^{th}$ device group is smaller than an area of non-opaque region area around the optical fingerprint sensing devices in the $(y+1)^{th}$ device group.

Referring to FIG. 5, in addition to the largest square region S2, in a pixel region R2, there are remaining 2A columns of the optical fingerprint sensing devices (long vertical lines in the left or right sides in FIG. 5 represents the optical fingerprint sensing devices in each column) disposed symmetrically on both sides of the largest square area S2, wherein A is an integer greater than 1 (as shown in FIG. 5, there are 3 columns in both left and right sides, so that A equals to 3 now). In the 2A columns of the optical fingerprint sensing devices, two columns of the optical fingerprint sensing device closest to the point-shaped backlight source 120 are defined as an $(x+1)^{th}$ device group, and other optical fingerprint sensing devices in the remaining 2A columns are set in a same manner, until two columns of the optical fingerprint sensing devices farthest from the point-shaped backlight source 120 are defined as an $(x+a)^{th}$ device group. The optical fingerprint sensing devices in the $z^{th}$ device group and the optical fingerprint sensing devices in the $(z+1)^{th}$ device group correspond to at least one of the following two cases, wherein z is an integer from x to x+a: in the first case, an effective photosensitive area of the optical fingerprint sensing devices in the $z^{th}$ device group is smaller than an effective photosensitive area of the optical fingerprint sensing devices in the $(z+1)^{th}$ device group. In the second case, an area of the non-opaque region area around the optical fingerprint sensing devices in the $z^{th}$ device group is smaller than an area of the non-opaque region area around the optical fingerprint sensing devices in the $(z+1)^{th}$ device group.

It should be noted that, in the embodiment, a variable relationship that the effective photosensitive area of the optical fingerprint sensing devices in the $x^{th}$ device group up to the $(x+a)^{th}$ device group, may be identical with a variable relationship that the effective photosensitive area of the optical fingerprint sensing devices in the first device group up to the $x^{th}$ device group, or may be different from the variable relationship that the effective photosensitive area of the optical fingerprint sensing devices in the first device group up to the $x^{th}$ device group.

Figure 6:
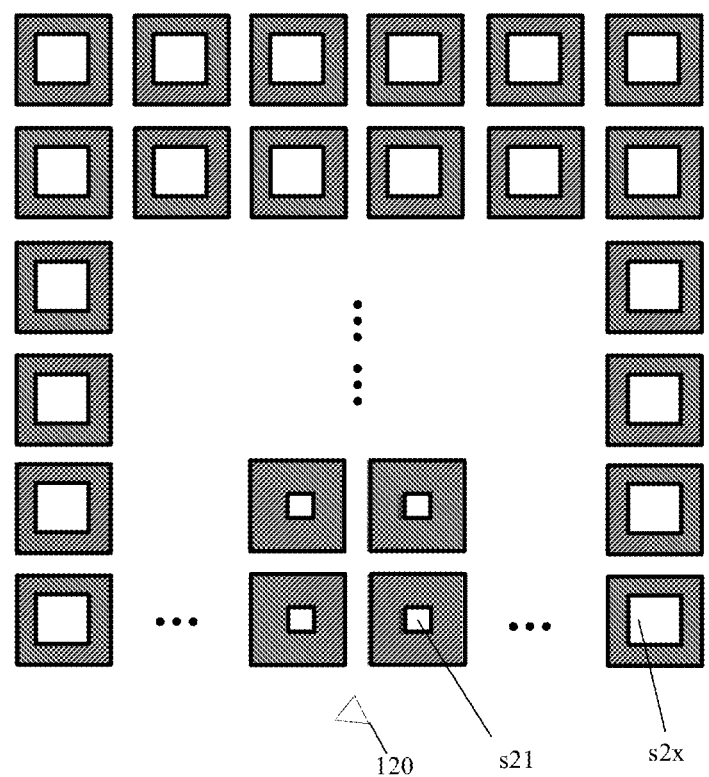
FIG. 6 schematically illustrates a diagram of photosensitive pixels in the first case according to the embodiment shown in FIG. 5.

In FIG. 6, a plurality of photosensitive pixels (not shown in FIG. 6) arranged in rows and columns are shown. Specifically, in the largest square region S2, two rows and two columns of the photosensitive pixel farthest from the point-shaped backlight source 120, and four photosensitive pixels closest to the point-shaped backlight source 120 (arranged in two rows and two columns) are shown, and dots in the figure represents some omitted photosensitive pixel.

FIG. 6 illustrates that each photosensitive pixel (not labeled) has the same size. The four photosensitive pixels closest to the point-shaped backlight source 120 are the optical fingerprint sensing devices s21 (the optical fingerprint sensing devices are shown as small rectangles in FIG. 6 and are partially labeled) in the first device group. And two farthest rows and two farthest columns (two columns are distributed on the left and right sides as shown in FIG. 6) of photosensitive pixels includes optical fingerprint sensing devices s2x in the $x^{th}$ device group, wherein the area of the optical fingerprint sensing device s21 in the first device group is the smallest, which indicates that the effective photosensitive area of the optical fingerprint sensing devices in the first device group is the smallest; the area of the optical fingerprint sensing device s2x in the $x^{th}$ device group is the largest, which indicates that the effective photosensitive area of the optical fingerprint sensing devices in the $x^{th}$ device group is the largest. The reason is the content of the first case precisely: an effective photosensitive area of the optical fingerprint sensing devices in the $y^{th}$ device group is smaller than an effective photosensitive area of the optical fingerprint sensing devices in the $(y+1)^{th}$ device group.

That is to say, FIG. 6 illustrates that a result of the first case in the second embodiment. Moreover, different from FIG. 3, the photosensitive areas of the optical fingerprint sensing devices in FIG. 6 are same, and there is a light blocking layer (not shown in FIG. 6) above the optical fingerprint sensing device. The light blocking layer is shown in the diagonal part of FIG. 6, and more details may be referred to FIG. 7.

Figure 7:
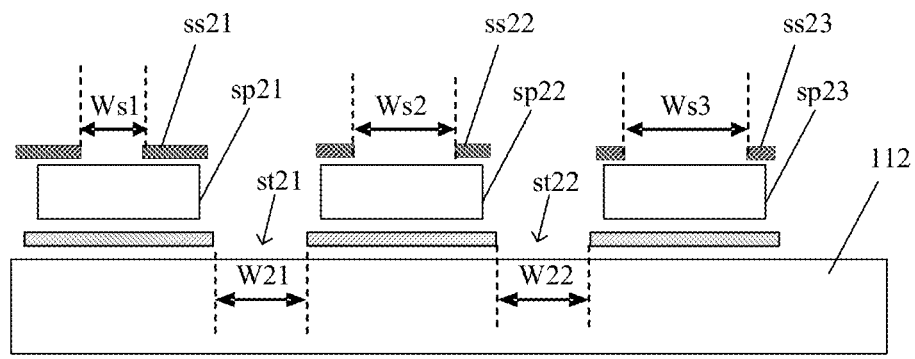
FIG. 7 schematically illustrates a cross-sectional view of a portion of the photosensitive pixels shown in FIG. 6.

Referring to FIG. 7, which illustrates a cross-sectional structure of a portion of the position corresponding to the embodiment in FIG. 6. The cross-sectional structure illustrates three photosensitive pixels the previous mentioned non-opaque substrate 112 of the optical fingerprint sensor. The three photosensitive pixels respectively have an optical fingerprint sensing device sp21, an optical fingerprint sensing device sp22, an optical fingerprint sensing device sp23, which are all disposed on the opaque layer (not labeled). There are some non-opaque regions between the different opaque layers. For example, a non-opaque region st21 and a non-opaque region st22 are shown in FIG. 7. In the embodiment, the areas of the non-opaque region in each photosensitive pixel are the same. As shown in FIG. 7, width W21 of the non-opaque region st21 and width W22 of the non-opaque region st22 are the same.

In the pixel region R2, a light blocking layer is disposed above each optical fingerprint sensing device. Each light blocking layer has an opening for exposing a surface of the optical fingerprint sensing device, and sizes of the openings are different, an area of the opening of the light blocking layer above the optical fingerprint sensing devices in the $y^{th}$ device group is smaller than an opening area of the light blocking layer above the optical fingerprint sensing devices in the $(y+1)^{th}$ device group, so that the effective photosensitive area of the optical fingerprint sensing devices in the $y^{th}$ device group is smaller than the effective photosensitive area of the optical fingerprint sensing devices in the $(y+1)^{th}$ device group. That is to say, when the photosensitive areas of the optical fingerprint sensing devices are the same, different optical fingerprint sensing devices have different photosensitive areas by providing the light blocking layers with different opening areas.

Specifically, FIG. 7 illustrates that a light blocking layer ss21 is disposed above the optical fingerprint sensing device sp21, and a light blocking layer ss22 is disposed above the optical fingerprint sensing device sp22, and a light blocking layer ss23 is disposed above the optical fingerprint sensing device sp23. The light blocking layer ss21, the light blocking layer ss22, and light blocking layer ss23 have openings (not labeled) respectively, and the openings are respectively used to expose device surfaces of the optical fingerprint sensing device sp21, the optical fingerprint sensing device sp22, and the optical fingerprint sensing device sp23. Moreover, opening areas of the light blocking layer ss21, the light blocking layer ss22, and light blocking layer ss23 sequentially increase, and in the cross-sectional layer of FIG. 7, width Ws1 is smaller than width Ws2 and width Ws2 is smaller than width Ws3.

It should be noted that, in FIG. 7, the area of the non-opaque region of the photosensitive pixel (or the area of the opaque region) is determined by the bottom opaque layer of the optical fingerprint sensing device (sp21, sp22 or sp23), that is to say, the corresponding opaque layer (ss21, ss22 or ss23) is disposed within the bottom light blocking layer of each photosensitive pixel.

It should be noted that each light blocking layer may be a single-layer structure or a multi-layer structure. Each light blocking layer may have one or more opening. The top view of the opening may various shapes, such as polygons and circles. The openings may be closed or non-closed.

It can be seen from FIG. 5 to FIG. 7 that, by disposing the light blocking layer with different openings on the optical fingerprint sensing device, the optical fingerprint sensing device corresponding to the device group that is farther away from the point-shaped backlight source 120 has a larger effective photosensitive area, so that the equivalent optical absorption rate o of the optical fingerprint sensing devices in different device groups is adjusted. While the closer to the point-shaped backlight 120, the stronger the incident light intensity of the corresponding light is, and the corresponding isocandela curves are shown as dashed lines in FIG. 5. When areas of the non-opaque regions around each optical fingerprint sensing devices are the same, the distribution of the intensity of incident light received by each photosensitive pixel is consistent with the light intensity distribution of the corresponding light. It may be seen that in the second embodiment, a variable rule of the effective photosensitive areas of the optical fingerprint sensing devices in different device groups is opposite to the variable rule of the light intensity shown in FIG. 5, so that for the photosensitive pixels in different device groups, the products of the incident light intensity d and the equivalent light absorption rate o are substantially similar, and the fingerprint signal is equal to the product the incident light intensity and the equivalent light absorption rate, which ensures that optical fingerprint sensing devices in different positions may receive roughly the same fingerprint signal finally.

That is to say, with the arrangement of FIG. 5 to FIG. 7, it is also ensured that the fingerprint signals received by each optical fingerprint sensing device may only have a slight difference, and may be substantially the same. Moreover, compared with the optical fingerprint sensing devices shown in FIG. 4, the optical fingerprint sensing devices shown in FIG. 7 have the same structure and property (as described above, the photosensitive areas of the optical fingerprint sensing device are the same), so that their characteristics like electronic noise and leakage are almost the same (in this embodiment, it is convenient to uniformly eliminate the following noise), which is beneficial to obtain fingerprint images with better quality.

Figure 8:
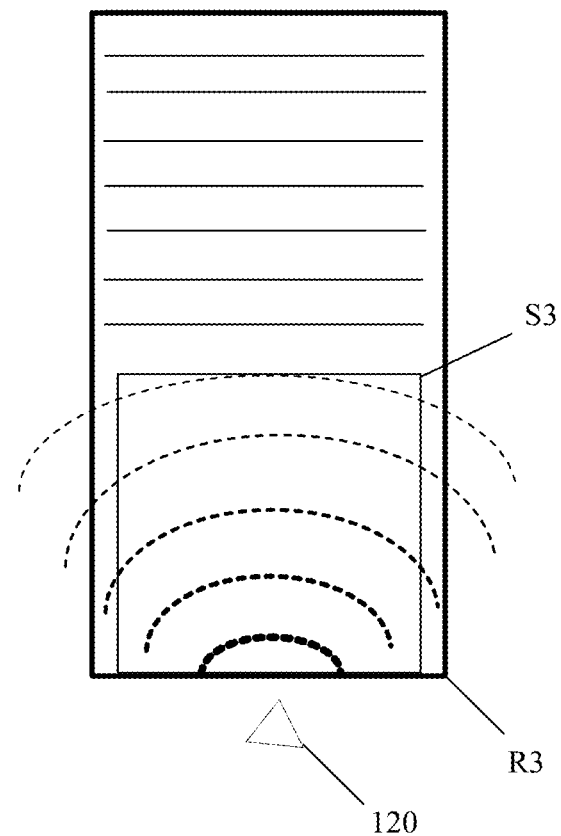
FIG. 8 schematically illustrates a top view of a pixel region according to an embodiment.

In the third embodiment, referring to FIG. 8, the top view shape of the pixel region R3 is a rectangle. In the embodiment, in the pixel region R3, a largest square region S3 whose center is closest to the point-shaped backlight source 120 is selected. Meanwhile, there are two scenarios that the largest square region S3 includes 2x×2x pieces of the optical fingerprint sensing devices, or the largest square region S3 includes (2x+1)×(2x+1) pieces of the optical fingerprint sensing devices, wherein x is an integer greater than 2.

In the embodiment, in the largest square region S3 selected in the same manner as the first embodiment, the $x^{th}$ device group up to the first device group are defined. Similarly, in the third embodiment, the optical fingerprint sensing devices in a $y^{th}$ device group and the optical fingerprint sensing devices in a $(y+1)^{th}$ device group correspond to at least one of the following two cases, wherein y is an arbitrary integer from 1 to x. In the first case, an effective photosensitive area of the optical fingerprint sensing devices in the $y^{th}$ device group is smaller than an effective photosensitive area of the optical fingerprint sensing devices in the $(y+1)^{th}$ device group. In the second case, an area of the non-opaque region around the optical fingerprint sensing devices in the $y^{th}$ device group is smaller than an area of non-opaque region area around the optical fingerprint sensing devices in the $(y+1)^{th}$ device group.

Referring to FIG. 8, in addition to the largest square region S3, in a pixel region R3, there are remaining A rows of the optical fingerprint sensing device (horizontal lines in FIG. 8 represents the optical fingerprint sensing devices in each row) disposed outside the largest square area S2, wherein A is an integer greater than 1 (there are 7 lines, so that A equals to 7). In the A rows of the optical fingerprint sensing device, a row of the optical fingerprint sensing device closest to the point-shaped backlight source 120 is defined as a $(x+1)^{th}$ device group, and other optical fingerprint sensing devices in the remaining A rows are set in a same manner, until a row of the optical fingerprint sensing device farthest from the point-shaped backlight source 120 are defined as an $(x+a)^{th}$ device group. The optical fingerprint sensing devices in the $z^{th}$ device group and the optical fingerprint sensing devices in the $(z+1)^{th}$ device group correspond to at least one of the following two cases, wherein z is an integer from x to x+a: in the first case, an effective photosensitive area of the optical fingerprint sensing devices in the $z^{th}$ device group is smaller than an effective photosensitive area of the optical fingerprint sensing devices in the $(z+1)^{th}$ device group. In the second case, an area of the non-opaque region around the optical fingerprint sensing devices in the $z^{th}$ device group is smaller than an area of the non-opaque region around the optical fingerprint sensing devices in the $(z+1)^{th}$ device group.

It should be noted that, in the third embodiment, a variable relationship of the effective photosensitive area of the optical fingerprint sensing devices from the $x^{th}$ device group and the $(x+a)^{th}$ device group may be identical with a variable relationship of the effective photosensitive area of the optical fingerprint sensing devices in the first device group up to the $x^{th}$ device group, or may be different from the variable relationship of the effective photosensitive area of the optical fingerprint sensing devices in the first device group up to the $x^{th}$ device group.

Figure 9:
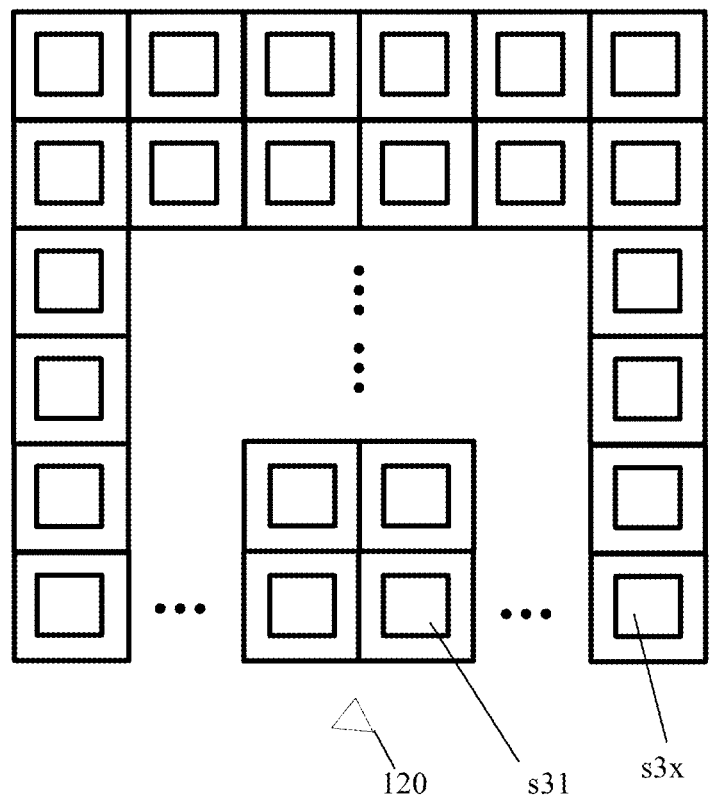
FIG. 9 schematically illustrates a diagram of the pixel region according to the embodiment shown in FIG. 8.

In FIG. 9, a plurality of photosensitive pixels (not shown in FIG. 9) arranged in rows and columns are shown. Specifically, in the largest square region S3, two farthest rows and two farthest columns of the photosensitive pixel from the point-shaped backlight source 120, and four closest photosensitive pixels from the point-shaped backlight source 120, and dots in the figure represents some omitted photosensitive pixel. FIG. 9 illustrates that each photosensitive pixel (the photosensitive pixels are shown as the large rectangles in FIG. 9 and are not labeled). The four photosensitive pixels closest to the point-shaped backlight source 120 are the optical fingerprint sensing device s31 (the optical fingerprint sensing devices are shown as small rectangles in FIG. 9 and are partially labeled) in the first device group. And two farthest rows and two farthest columns of photosensitive pixels includes an optical fingerprint sensing device s3x in the $x^{th}$ device group, wherein photosensitive areas of the optical fingerprint sensing devices in each device group are the same. FIG. 9 illustrates that a result of the second case in the third embodiment. In FIG. 9, photosensitive areas of the optical fingerprint sensing device are the same, but different photosensitive pixels have different areas of the non-opaque regions, and more details may be referred to FIG. 10.

Figure 10:
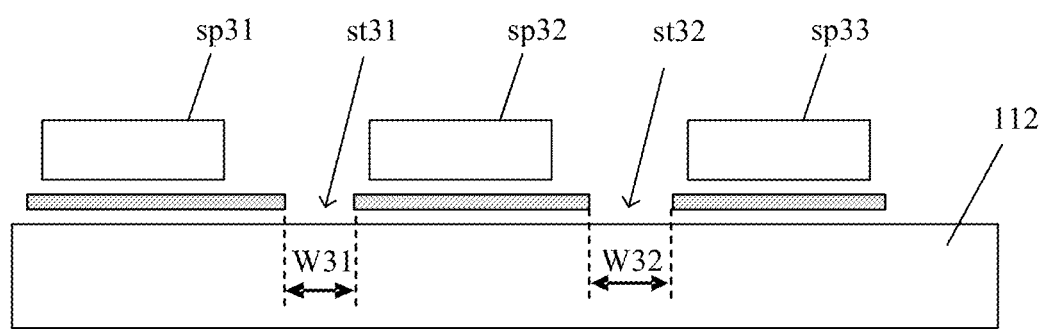
FIG. 10 schematically illustrates a diagram of photosensitive pixels in a second case according to the embodiment shown in FIG. 8.

Referring to FIG. 10, which illustrates a cross-sectional structure of a part of the position corresponding to the embodiment in FIG. 9. The cross-sectional structure includes three photosensitive pixels and the previous mentioned non-opaque substrate 112 of the optical fingerprint sensor. The three photosensitive pixels respectively have an optical fingerprint sensing device sp31, an optical fingerprint sensing device sp32, an optical fingerprint sensing device sp33, which are all disposed on the opaque layer (not labeled). There are some non-opaque regions between the different opaque layers. For example, a non-opaque region st31 and a non-opaque region st32 are shown in FIG. 10.

From the above description, the non-opaque regions of the pixels are determined by the opaque layer under the optical fingerprint sensing devices. In some embodiment, the areas of the opaque layers are controlled to be different, in order to realize different areas of the non-opaque regions.

FIG. 10 illustrates that areas of the non-opaque are adjusted, so that an area of the non-opaque region around the optical fingerprint sensing devices in the $y^{th}$ device group is smaller than an area of the non-opaque region around the optical fingerprint sensing devices in the $(y+1)^{th}$ device group. As FIG. 10 shows a cross-sectional structure, the fact that an area of the non-opaque region around the optical fingerprint sensing devices in the $y^{th}$ device group is smaller than an area of the non-opaque region around the optical fingerprint sensing devices in the $(y+1)^{th}$ device group is represented by showing that width W31 of the non-opaque region st31 is smaller than width W32 of the non-opaque region st32.

With the premise that the second case is adopted, as mentioned before (both shown in FIG. 9 and FIG. 10), the optical fingerprint sensing devices in each device group have the same photosensitive area. The optical fingerprint sensing device sp31, the optical fingerprint sensing device sp32, and the optical fingerprint sensing device sp33 have the same size, so that their photosensitive areas are the same.

Each dashed line in FIG. 8 shows partial corresponding isocandela curves, and the farther from the point-shaped backlight source 120, the weaker the corresponding light intensity of light is. However, the variable rule of the non-opaque region area of different photosensitive pixels shown in FIG. 10 and the variable rule of the light intensity shown in FIG. 8 are just opposite. Therefore, it may be seen from FIG. 8 to FIG. 10, in the third embodiment, by adjusting the farther optical fingerprint sensing device from the point-shaped backlight source 120 to correspond to the larger non-opaque region area (specifically adjusting in units of groups, and more specifically, the photosensitive pixels where the optical fingerprint sensing devices are disposed have the non-opaque region area), so that incident light intensities d obtained by different optical fingerprint sensing devices finally are substantially the same. Meanwhile, in the third embodiment, the effective photosensitive areas of different optical fingerprint sensing devices are equal, and accordingly, the equivalent optical absorption rate o of different optical fingerprint sensing devices are equal. Finally, the products of the incident light intensity d and the equivalent light absorption rate o of the different optical fingerprint sensing devices are substantially equal to each other. Therefore, it is also ensure that the fingerprint signals received by the each optical fingerprint sensing devices may only have a slight different, and reach substantially the same level.

Moreover, compared with the optical fingerprint sensing devices shown in FIG. 4, the optical fingerprint sensing devices shown in FIG. 10 have the same structure and property (as described above, the photosensitive areas of the optical fingerprint sensing device are the same), so that their characteristics like electronic noise and leakage are almost the same (in this embodiment, it is convenient to uniformly eliminate the following noise), which is beneficial to obtain fingerprint images with better quality.

It should be noted that, in the third embodiment, the reason why the intensity d of incident light for different optical fingerprint sensing devices are adjusted to be substantially the same is that: different photosensitive pixels have different areas of non-opaque regions. Specifically, the farther the photosensitive pixel from the point-shaped backlight source 120, the larger the area of the non-opaque region is, which corresponds to the characteristic that the farther the photosensitive pixel from the point-shaped backlight source 120, the weaker the light intensity is. Therefore, after passing through the device layer, those light is reflected from upside of the device layer, and the intensity d of the incident light reaching each optical fingerprint sensing device is substantially equal.

For the first three embodiments, all of the optical fingerprint sensing devices are arranged in rows and columns, the point-shaped backlight source is disposed obliquely below the optical fingerprint sensing devices in the outermost row in the corresponding pixel region, and a distance from the center of the largest square region to the point-shaped backlight source is the shortest. Therefore, the selection of the largest square region is unique.

Figure 11:
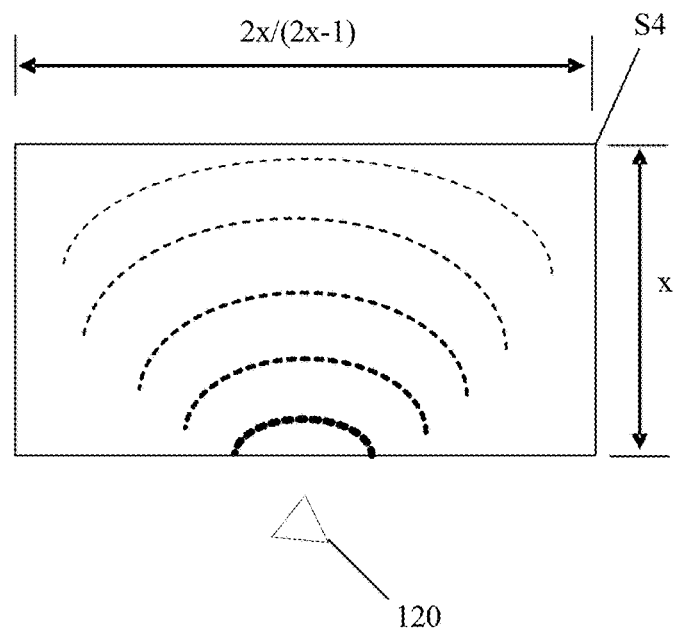
FIG. 11 schematically illustrates a top view of a pixel region according to an embodiment.

Referring to FIG. 11, in the fourth embodiment, a top view shape of the pixel region is a rectangle, and meanwhile, the pixel region includes x×(2x−1) pieces of the optical fingerprint sensing devices with x rows and (2x−1) columns; or the pixel region includes x×2x of the optical fingerprint sensing devices with x rows and 2x columns, wherein x is an integer greater than 2.

In the embodiment, in the pixel region, a largest rectangular region S4 whose center is closest to the point-shaped backlight source 120 is selected. Meanwhile, the largest rectangular region S4 is the pixel region. Specifically, when the pixel region includes x×(2x−1) pieces of the optical fingerprint sensing devices, the largest rectangular region S4 includes x×(2x−1) pieces of the optical fingerprint sensing devices; or when the pixel region includes x×2x of the optical fingerprint sensing devices, the largest rectangular region S4 includes x×(2x−1) pieces of the optical fingerprint sensing devices.

In the embodiment, in the largest rectangular region S4 selected above, one row and two columns of the optical fingerprint sensing device farthest from the point-shaped backlight source are defined as a $x^{th}$ device group, and one row and two second of the optical fingerprint sensing device secondly farthest from the point-shaped backlight source are defined as a $(x-1)^{th}$ device group, and other optical fingerprint sensing devices in the largest square region are set in a same manner, until the remaining optical fingerprint sensing devices are defined as a first device group.

Further, in the embodiment, the optical fingerprint sensing devices in a $y^{th}$ device group and the optical fingerprint sensing devices in a $(y+1)^{th}$ device group correspond to at least one of the following two cases, wherein y is an integer from 1 to x. In a first case, an effective photosensitive area of the optical fingerprint sensing devices in the $y^{th}$ device group is smaller than an effective photosensitive area of the optical fingerprint sensing devices in the $(y+1)^{th}$ device group. In a second case, an area of the non-opaque region around the optical fingerprint sensing devices in the $y^{th}$ device group is smaller than an area of the non-opaque region around the optical fingerprint sensing devices in the $(y+1)^{th}$ device group.

In the embodiment shown in FIG. 11, which case between the optical fingerprint sensing devices in a $y^{th}$ device group and the optical fingerprint sensing devices in a $(y+1)^{th}$ device group is selected, and after the corresponding case is selected, structures and properties of the corresponding photosensitive pixels and the optical fingerprint sensing devices may refer to corresponding contents of FIG. 3 and FIG. 4; or FIG. 6 and FIG. 7; or FIG. 9 and FIG. 10.

Figure 12:
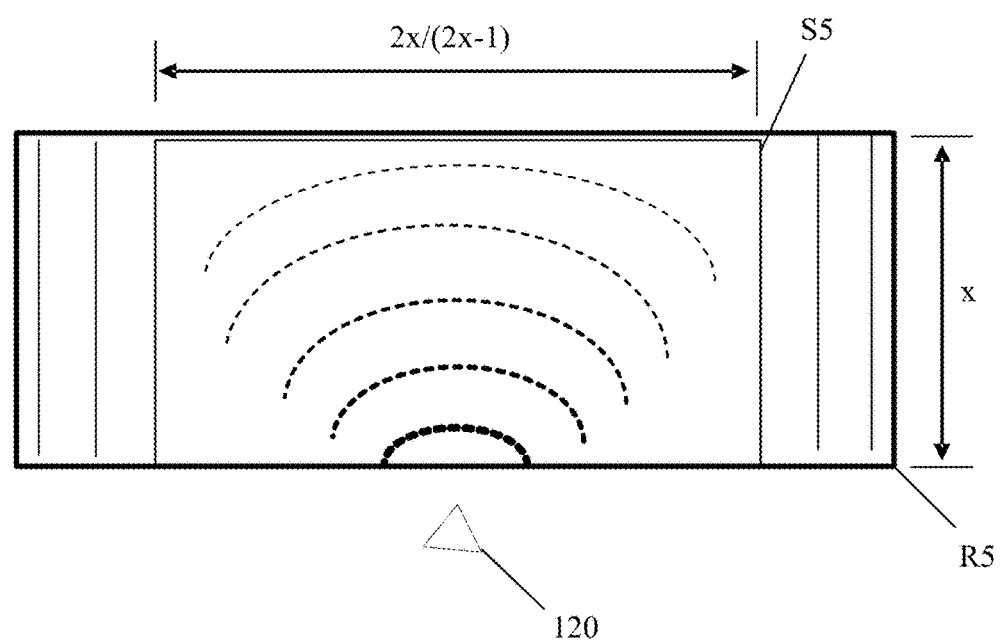
FIG. 12 schematically illustrates a top view of a pixel region according to an embodiment.

Referring to FIG. 12, in the fifth embodiment, a top view shape of a pixel region R5 is a rectangle. In the embodiment, in the pixel region R5, a largest special rectangular region S5 whose center is closest to the point-shaped backlight source 120 is selected. Meanwhile, there are two cases: the largest special rectangular region S5 includes x×(2x−1) pieces of the optical fingerprint sensing devices with x rows and (2x−1) columns; or the largest special rectangular region S5 includes x×2x of the optical fingerprint sensing devices with x rows and 2x columns, wherein x is an integer greater than 2.

In the embodiment, the $x^{th}$ device group up to the first device group are defined in the selected largest special rectangular region S5 as the same manner in the fourth embodiment. Similarly, in the embodiment, the optical fingerprint sensing devices in a $y^{th}$ device group and the optical fingerprint sensing devices in a $(y+1)^{th}$ device group correspond to at least one of the following two cases, wherein y is an integer from 1 to x. In the first case, an effective photosensitive area of the optical fingerprint sensing devices in the $y^{th}$ device group is smaller than an effective photosensitive area of the optical fingerprint sensing devices in the $(y+1)^{th}$ device group. In the second case, an area of non-opaque region around the optical fingerprint sensing devices in the $y^{th}$ device group is smaller than an area of non-opaque region area around the optical fingerprint sensing devices in the $(y+1)^{th}$ device group.

Referring to FIG. 12, in addition to the largest rectangular region S5, in a pixel region R5, there are remaining 2A columns of the optical fingerprint sensing device (long vertical lines in the left or right sides in FIG. 12 represents the optical fingerprint sensing devices in each column) disposed symmetrically on both sides of the largest rectangular region S5, wherein A is an integer greater than 1 (as shown in FIG. 12, there are 2 columns in both left and right sides, so that A equals to 2 now). In the 2A columns of the optical fingerprint sensing devices, two columns of the optical fingerprint sensing devices closest to the point-shaped backlight source 120 are defined as an $(x+1)^{th}$ device group, and other optical fingerprint sensing devices in the remaining 2A columns are set in a same manner, until two columns of the optical fingerprint sensing devices farthest from the point-shaped backlight source 120 are defined as an $(x+a)^{th}$ device group. The optical fingerprint sensing devices in the $z^{th}$ device group and the optical fingerprint sensing devices in the $(z+1)^{th}$ device group correspond to at least one of the following two cases, wherein z is an integer from x to x+a: in the first case, an effective photosensitive area of the optical fingerprint sensing devices in the $z^{th}$ device group is smaller than an effective photosensitive area of the optical fingerprint sensing devices in the $(z+1)^{th}$ device group. In the second case, an area of the non-opaque region area around the optical fingerprint sensing devices in the $z^{th}$ device group is smaller than an area of the non-opaque region area around the optical fingerprint sensing devices in the $(z+1)^{th}$ device group.

It should be noted that, in the embodiment, a variable relationship that the effective photosensitive area of the optical fingerprint sensing devices in the $x^{th}$ device group up to the $(x+a)^{th}$ device group, may be identical with a variable relationship that the effective photosensitive area of the optical fingerprint sensing devices in the first device group up to the $x^{th}$ device group, or may be different from the variable relationship that the effective photosensitive area of the optical fingerprint sensing devices in the first device group up to the $x^{th}$ device group.

In the embodiment shown in FIG. 12, which case between the optical fingerprint sensing devices in a $y^{th}$ device group and the optical fingerprint sensing devices in a $(y+1)^{th}$ device group is selected, and after the corresponding case is selected, structures and properties of the corresponding photosensitive pixels and the optical fingerprint sensing devices may refer to corresponding contents of FIG. 3 and FIG. 4; or FIG. 6 and FIG. 7; or FIG. 9 and FIG. 10.

Figure 13:
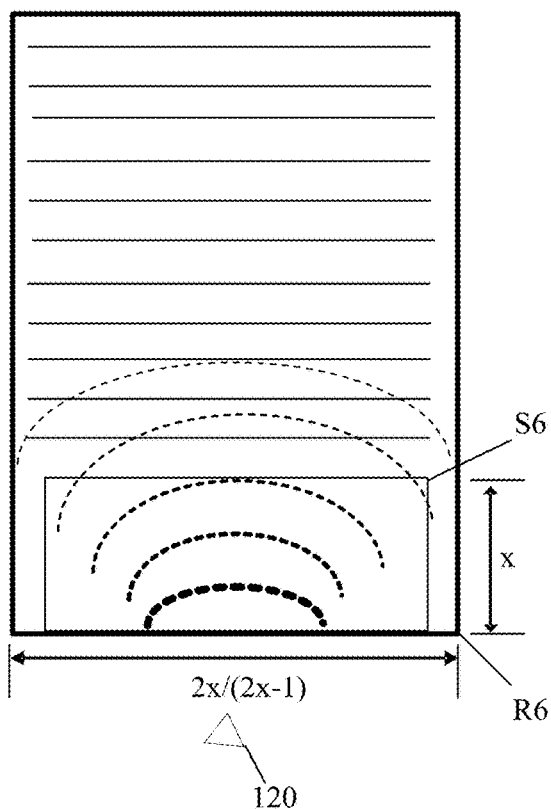
FIG. 13 schematically illustrates a top view of a pixel region according to an embodiment.

Referring to the FIG. 13, in the sixth embodiment, a top view shape of a pixel region R6 is a rectangle. In the embodiment, in the pixel region R6, a largest special rectangular region S6 whose center is closest to the point-shaped backlight source 120 is selected. Meanwhile, there are two cases: the largest special rectangular region S6 includes x×(2x−1) pieces of the optical fingerprint sensing devices with x rows and (2x−1) columns; or the largest special rectangular region S6 includes x×2x of the optical fingerprint sensing devices with x rows and 2x columns, wherein x is an integer greater than 2.

In the embodiment, the $x^{th}$ device group up to the first device group are defined in the selected largest special rectangular region S6 as the same manner in the fourth embodiment. Similarly, in the embodiment, the optical fingerprint sensing devices in a $y^{th}$ device group and the optical fingerprint sensing devices in a $(y+1)^{th}$ device group correspond to at least one of the following two cases, wherein y is an integer from 1 to x. In the first case, an effective photosensitive area of the optical fingerprint sensing devices in the $y^{th}$ device group is smaller than an effective photosensitive area of the optical fingerprint sensing devices in the $(y+1)^{th}$ device group. In the second case, an area of non-opaque region around the optical fingerprint sensing devices in the $y^{th}$ device group is smaller than an area of non-opaque region area around the optical fingerprint sensing devices in the $(y+1)^{th}$ device group.

Referring to FIG. 13, in addition to the largest rectangular region S6, in a pixel region R6, there are remaining A rows of the optical fingerprint sensing device (horizontal lines in FIG. 13 represents the optical fingerprint sensing devices in each row) disposed outside the largest rectangular region S6, wherein A is an integer greater than 1 (there are 11 lines, so that A equals to 11 now). In the A rows of the optical fingerprint sensing devices, a closest row of the optical fingerprint sensing devices from the point-shaped backlight source 120 is defined as a $(x+1)^{th}$ device group, and other optical fingerprint sensing devices in the remaining A rows are set in a same manner, until one rows of the optical fingerprint sensing devices farthest from the point-shaped backlight source 120 are defined as an $(x+a)^{th}$ device group. The optical fingerprint sensing devices in the $z^{th}$ device group and the optical fingerprint sensing devices in the $(z+1)^{th}$ device group correspond to at least one of the following two cases, wherein z is an integer from x to x+a: in the first case, an effective photosensitive area of the optical fingerprint sensing devices in the $z^{th}$ device group is smaller than an effective photosensitive area of the optical fingerprint sensing devices in the $(z+1)^{th}$ device group. In the second case, an area of the non-opaque region area around the optical fingerprint sensing devices in the $z^{th}$ device group is smaller than an area of the non-opaque region area around the optical fingerprint sensing devices in the $(z+1)^{th}$ device group.

It should be noted that, in the embodiment, a variable relationship that the effective photosensitive area of the optical fingerprint sensing devices in the $x^{th}$ device group up to the $(x+a)^{th}$ device group, may be identical with a variable relationship that the effective photosensitive area of the optical fingerprint sensing devices in the first device group up to the $x^{th}$ device group, or may be different from the variable relationship that the effective photosensitive area of the optical fingerprint sensing devices in the first device group up to the $x^{th}$ device group.

In the embodiment shown in FIG. 13, which case between the optical fingerprint sensing devices in a $y^{th}$ device group and the optical fingerprint sensing devices in a $(y+1)^{th}$ device group is selected, and after the corresponding case is selected, structures and properties of the corresponding photosensitive pixels and the optical fingerprint sensing devices may refer to corresponding contents of FIG. 3 and FIG. 4; or FIG. 6 and FIG. 7; or FIG. 9 and FIG. 10.

For the fourth embodiment to the sixth embodiment, all of the optical fingerprint sensing devices are arranged in rows and columns, the point-shaped backlight source is disposed obliquely below the outermost row in the corresponding pixel region, and a distance from the center of the largest square region to the point-shaped backlight source is the shortest. Therefore, the selection of largest square area is unique.

In the embodiment, it is required to ensure, as far as possible, that the distance between the point-shaped backlight source and the largest square region (referring to the largest square region S1, the largest square region S2, the largest square region S3 in the first three embodiments) is shortest, or that the distance between the point-shaped backlight source and the largest rectangular region (referring to the largest rectangular region S4, the largest rectangular region S5, the largest rectangular region S6 in the fourth to the sixth embodiments) is shortest. Therefore, in actual assembly, the point-shaped backlight source needs to be aligned accurately. On the contrary, if there is no accurate alignment, the light intensity distribution of emitted light of the actual point-shaped backlight source deviates from the originally expected light intensity distribution, which may result in the failure in achieving the corresponding technical effect that the optical fingerprint sensing devices in different positions receive the substantially same intensity of fingerprint signals.

From analysis of the above six embodiments, in embodiments of the present disclosure, the optical fingerprint sensing devices are grouped into different device groups, and the optical fingerprint sensing devices in different device groups are set in different cases (each embodiment may corresponding to at least one of the two cases), so that the differences of fingerprint signals received by the optical fingerprint sensing devices are reduced. Therefore, each optical fingerprint sensing device obtains a similar fingerprint signal, and quality of the finally obtained fingerprint image is improved.

Figure 14:
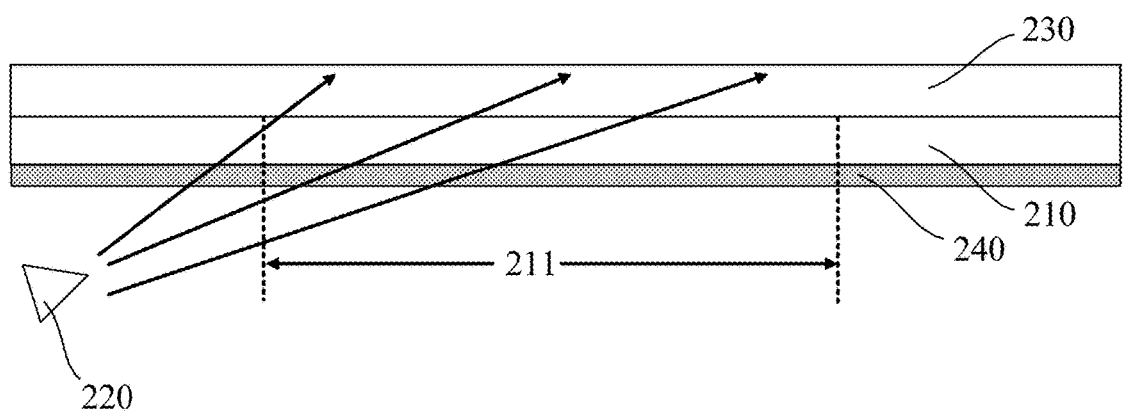
FIG. 14 schematically illustrates a cross-sectional view of an optical fingerprint module according to an embodiment.

In an embodiment of the present disclosure, an optical fingerprint module is provided. Referring to FIG. 14, FIG. 14 schematically illustrates a cross-sectional view of an optical fingerprint module, and the optical fingerprint module includes a protective layer 230, an optical fingerprint sensor 210 and a point-shaped backlight source 220.

In some embodiment, the point-shaped backlight source 220 is disposed below the pixel region 211, and an angle formed by light emitted from the point-shaped backlight source 220 and an upper surface of the protective layer 230 is an acute angle.

In some embodiment, the light emitted by the point-shaped backlight source 220 is shown by the black unidirectional arrow in FIG. 14. Because the point-shaped backlight source 220 is disposed below the pixel region 211, the point-shaped backlight source 220 is disposed at one side of the pixel region 211 in the cross-sectional view shown in FIG. 14. Moreover, in the cross-sectional view shown in FIG. 1, the region rightly under the pixel region 211 is a region between two long dashed lines, and the point-shaped backlight source 220 falls outside this region. Therefore, FIG. 1 shows that the point-shaped backlight source 220 is disposed below the pixel region 211, and it is easy to understand that the "below" means "outboard below". In some embodiment, the point-shaped backlight 220 may be adjusted in a suitable position, in order to improve definition of a fingerprint image formed by the optical fingerprint module.

Other structures and content of the optical fingerprint module which are not mentioned in the embodiment can be referred to the foregoing descriptions.

Different from the foregoing embodiments, as shown in FIG. 14, in the embodiment, a light anti-reflection layer 240 is further formed on a surface of the optical fingerprint sensor 210 which is closer to the point-shaped backlight 220, to increase a proportion of the light emitted from the backlight source which enters the optical fingerprint sensor 210.

In the optical fingerprint module provided in the embodiment, the entire optical fingerprint module may recognize the fingerprint image and form a clear fingerprint image without a light guide plate, which simplifies a structure of the optical fingerprint module, and reduce cost. Besides, the light anti-reflection layer 240 is further formed on the surface of the optical fingerprint sensor 210 which is closer to the point-shaped backlight 220, to increase a proportion of the light emitted from the backlight source 220 which enters the optical fingerprint sensor 210. Therefore, during fingerprint image acquisition, more light may be used to acquire fingerprint images, which leads to higher definition and accuracy of the fingerprint images, and further improves performance of the optical fingerprint module.

Figure 15:
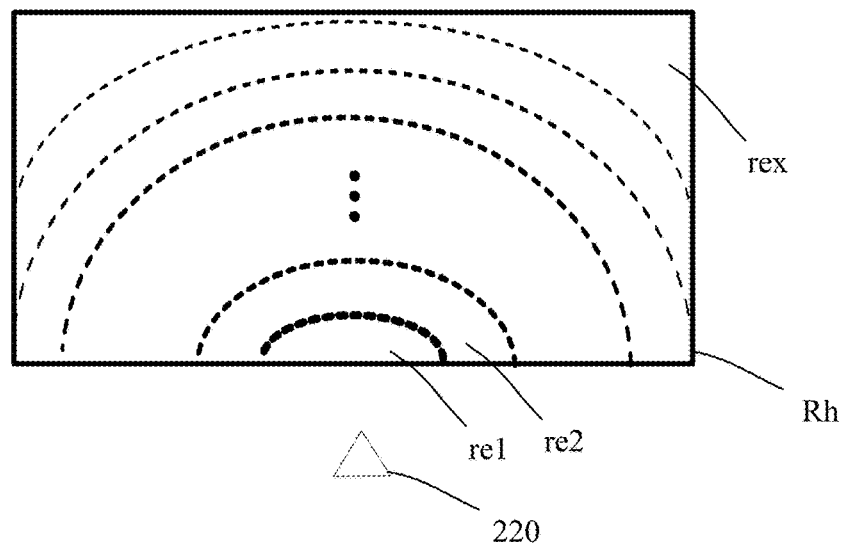
FIG. 15 schematically illustrates a top view of a pixel region of the optical fingerprint module shown in FIG. 14.

Referring to FIG. 15, FIG. 15 schematically illustrates a top view of a pixel region Rh corresponding to the point-shaped backlight source 220. The top view shape of the pixel region Rh is a rectangle. In some embodiment, the top view shape of the pixel region Rh may be a square.

In some embodiment, the pixel regions are divided. In one pixel region, the pixel region is divided into a plurality of light intensity regions sequentially from a first light intensity region to an $x^{th}$ light intensity region according to a distance relative to the corresponding point-shaped backlight source, from a shortest distance to a longest distance, wherein a whole shape of a second light intensity region to an $(x-1)^{th}$ light intensity region presents an arc-shaped bar or an elliptical arc-shaped bar, wherein x is an integer greater than 3. the optical fingerprint sensing devices in the first light intensity region are defined as a first device group and the optical fingerprint sensing devices in the second light intensity region are defined as a second device group, and the optical fingerprint sensing devices in the $x^{th}$ light intensity region are defined as an $x^{th}$ device group.

Specifically, in the pixel region Rh shown and labeled in FIG. 15, there are a first light intensity region re1 that is closest to the point-shaped backlight source 220, a second light intensity region re2 that is secondly closest to the point-shaped backlight source 220, and an $x^{th}$ light intensity region rex that is farthest from the point-shaped backlight source 220. The dashed lines in FIG. 15 are the isocandela curves, and are also separation lines between different light intensity regions. It may be seen from FIG. 15 that the overall shape of the second light intensity region to the $(x-1)$th light intensity region is an arc-shaped bar, which represents a region between two isocandela curves is a light intensity region.

In some embodiment, in the divided device groups mentioned above, the optical fingerprint sensing devices in the $y^{th}$ device group and the optical fingerprint sensing devices in the $(y+1)^{th}$ device group correspond to at least one of the following two cases, wherein y is an integer from 1 to x: in a first case, an effective photosensitive area of the optical fingerprint sensing devices in the $y^{th}$ device group is smaller than an effective photosensitive area of the optical fingerprint sensing devices in the $(y+1)^{th}$ device group; in a second case, an area of the non-opaque region around the optical fingerprint sensing devices in the $y^{th}$ device group is smaller than an area of the non-opaque region around the optical fingerprint sensing devices in the $(y+1)^{th}$ device group.

Figure 16:
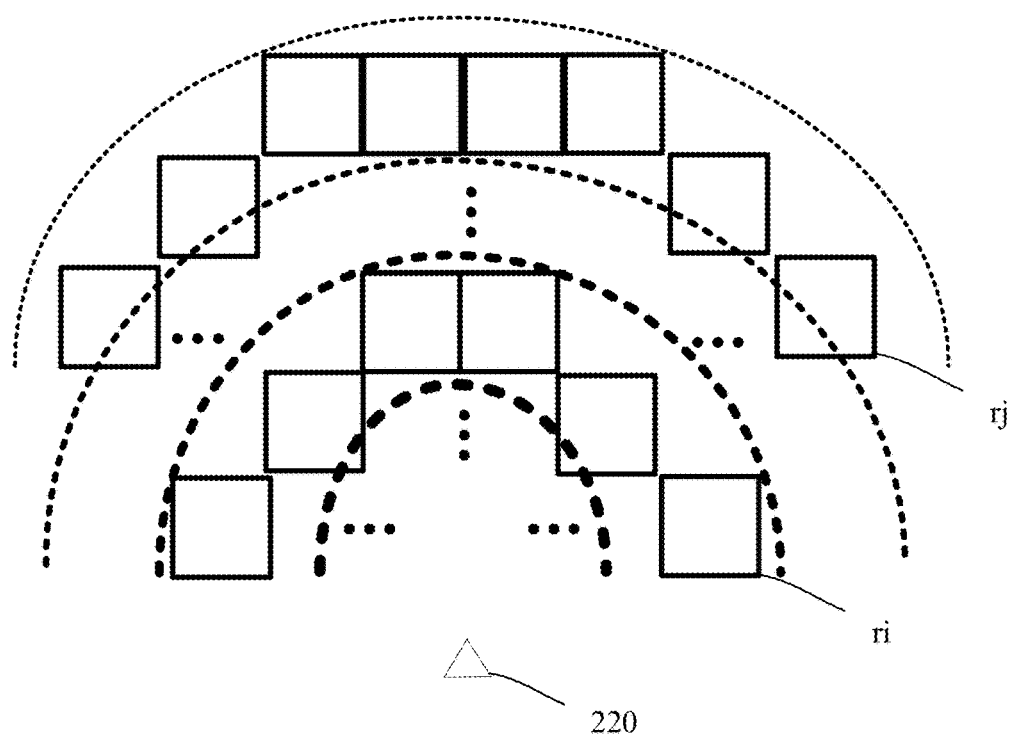
FIG. 16 schematically illustrates a diagram of photosensitive pixels in the pixel region shown in FIG. 15.

Specifically, in FIG. 16, a plurality of photosensitive pixels (not labeled in FIG. 16) disposed in the $ri^{th}$ light intensity region, and photosensitive pixels in the $rj^{th}$ light intensity region are shown. Dots in the figure indicate that some of the photosensitive pixels are omitted. FIG. 16 illustrates that each photosensitive pixel has the same size, and the photosensitive pixels in the same light intensity region are curved toward the point-shaped backlight source 220. It may be seen from FIG. 16 that the optical fingerprint sensing devices are arranged in rows and columns. However, in some embodiment, in the above division of the light intensity region, the optical fingerprint sensing devices may not be arranged in rows and columns, which does not affect the division of the light intensity region.

In the first case, a photosensitive area of the optical fingerprint sensing devices in the $y^{th}$ device group is smaller than a photosensitive area of the optical fingerprint sensing devices in the $(y+1)^{th}$ device group, and the photosensitive area is equal to the effective photosensitive area, so that the effective photosensitive area of the optical fingerprint sensing devices in the $y^{th}$ device group is smaller than the effective photosensitive area of the optical finger print sensing device in the $(y+1)^{th}$ device group. Or, in the first case, all photosensitive areas of the optical fingerprint sensing devices are the same, and the optical fingerprint sensing device has a light blocking layer above, and the light blocking layer has an opening for exposing a surface of the optical fingerprint sensing device; an area of opening of the light blocking layer above the optical fingerprint sensing devices in the $y^{th}$ device group is smaller than an area of opening of the light blocking layer above the optical fingerprint sensing devices in the $(y+1)^{th}$ device group, so that the effective photosensitive area of the optical fingerprint sensing devices in the $y^{th}$ device group is smaller than the effective photosensitive area of the optical fingerprint sensing devices in the $(y+1)^{th}$ device group. In the second embodiment, all photosensitive areas of the optical fingerprint sensing devices are the same.

Figure 17:
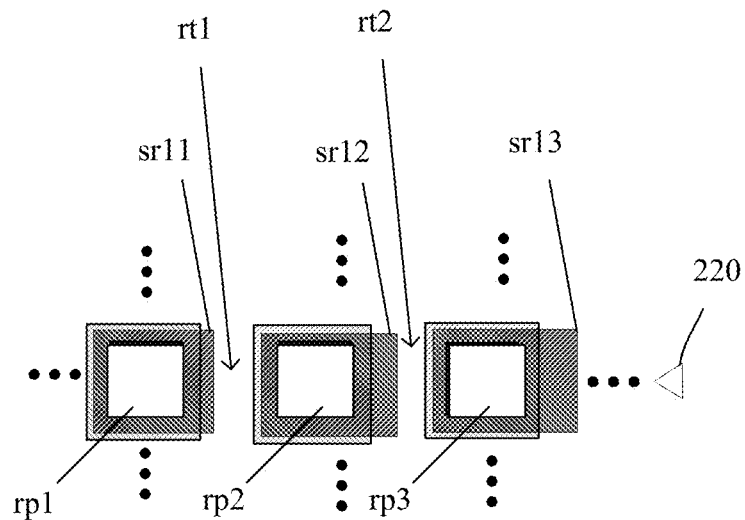
FIG. 17 schematically illustrates a specific top view of a portion of the photosensitive pixels shown in FIG. 16.
Figure 18:
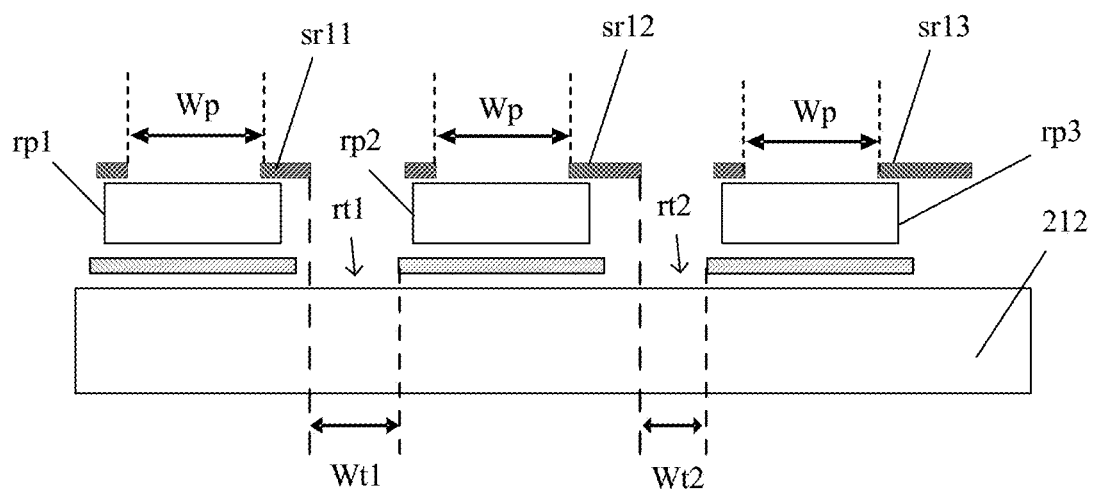
FIG. 18 schematically illustrates a cross-sectional view of the photosensitive pixels shown in FIG. 17.

In some embodiment, a specific structure of the second case is shown by FIG. 17 and FIG. 18. FIG. 17 schematically illustrates a specific top view of a portion of the pixel regions shown in FIG. 16, and FIG. 18 schematically illustrates a corresponding cross-sectional view.

FIG. 17 illustrates three photosensitive pixels (not labeled discriminatively, and not showing a space between them), and the three photosensitive pixels have an optical fingerprint sensing device rp1, an optical fingerprint sensing device rp2, and an optical fingerprint sensing device rp3. Optical fingerprint sensing device rp1 is covered by a light blocking layer sr11, and the light blocking layer sr11 has an opening (not labeled) for exposing a surface of the optical fingerprint sensing device rp1; optical fingerprint sensing device rp2 is covered by a light blocking layer sr12, and the light blocking layer sr12 has an opening (not labeled) for exposing a surface of the optical fingerprint sensing device rp2; optical fingerprint sensing device rp3 is covered by a light blocking layer sr13, and the light blocking layer sr13 has an opening (not labeled) for exposing a surface of the optical fingerprint sensing device rp3. The different openings mentioned above have the same area. In FIG. 18, the widths of the openings in the same direction are both Wp.

FIG. 17 shows some other opaque layers (nor labeled). Combined with FIG. 18, all optical fingerprint sensing devices are disposed on the opaque layers. Moreover, referring to FIG. 17 and FIG. 18, in the top view structure and the cross-sectional view structure, the non-opaque region is jointly determined by these opaque layers and these light blocking layers. For example, the non-opaque region rt1 is limited both by the light blocking layer sr11 and by the opaque layer below the optical fingerprint sensing device rp2, and therefore, it has width Wt1 in the cross-section shown in FIG. 18. Similarly, the non-opaque region rt2 is limited both by the light blocking layer sr12 and by the opaque layer below the optical fingerprint sensing device rp3, and therefore, it has width Wt2 in the cross-section shown in FIG. 18. Moreover, in FIG. 18, an area of the light blocking layer sr12 is greater than an area of the light blocking layer sr11, so that an area of the non-opaque region rt2 is smaller than an area of the non-opaque region rt1, which is shown as the fact that the width of the non-opaque region rt2 is less than the width of the non-opaque region rt1 in FIG. 18.

FIG. 18 also illustrates that the above structure is disposed on a non-opaque substrate 212, the non-opaque substrate 212 is a low substrate of the optical fingerprint sensor 210 in FIG. 14, and the non-opaque substrate 212 is not shown in FIG. 14, and it is shown in the cross-sectional structure in FIG. 18.

As shown in FIG. 17 and FIG. 18, by adjusting different areas of the non-opaque region, an area of the non-opaque region around the optical fingerprint sensing devices in the $y^{th}$ device group is smaller than an area of the non-opaque region around the optical fingerprint sensing devices in the $(y+1)^{th}$ device group. Accordingly, the second case is applied. And in this premise, it also has two characteristics: firstly, as mentioned earlier, all photosensitive areas of the optical fingerprint sensing devices in each device group are equal. The sized of the optical fingerprint sensing device rp1, the optical fingerprint sensing device rp2 and the optical fingerprint sensing device rp3 are the same; secondly, opaque layers below the optical fingerprint sensing devices in each device group have the same area.

The second characteristic above is different from the structure shown in FIG. 10. The difference may lead to better fingerprint acquisition. The reason lies in that: the opaque layer below the optical fingerprint sensing device generally includes one or more metal layers which generally have electrical functions as storage capacitors, data lines or electrode layers of the optical fingerprint sensing devices. The areas of the opaque layers in FIG. 17 and FIG. 18 are the same. Compared with the structure shown in FIG. 10, in different photosensitive pixels in FIG. 17 and FIG. 18, these storage capacitors, data lines and electrode layers are easily to be made with the same structure. In this way, an amount of signals and a signal-to-noise ratio of each photosensitive pixel are closer, and uniformity of the corresponding fingerprint image is better. The optical fingerprint sensing devices have the same structure and property, and areas of opaque layers below the each optical fingerprint sensing device are the same, so that their characteristics like electronic noise and leakage are almost the same (in this embodiment, it is convenient to uniformly eliminate subsequent noises), which is beneficial to obtain a better fingerprint image.

That is to say, in some embodiment, the opaque layers below the optical fingerprint sensing device have the same area, in order to ensure that the amount of signals and the signal-to-noise ratio of each pixel are closer. In addition, the light blocking layers above the optical fingerprint sensing device have different areas (because the light blocking layer above the optical fingerprint sensing device has less influence on the amount of signals and the signal-to-noise ratio, especially on the noise and the leakage), and cooperate with the bottom opaque layer, to achieve the purpose of the second case.

Dashed lines in FIG. 16 show partial corresponding isocandela curves, and the farther the isocandela curve is from the point-shaped backlight source 220, the weaker the corresponding light intensity of light is. However, the variable rule of the area of the non-opaque regions of different photosensitive pixels shown in FIG. 17 and FIG. 18 is opposite to the variable rule of the light intensity shown in FIG. 16. Therefore, it may be seen from FIG. 15 to FIG. 18, in the embodiment by adjusting the optical fingerprint sensing device farther from the point-shaped backlight source 220 to correspond to the larger area of non-opaque region, so that the intensity d of incident light obtained by different optical fingerprint sensing devices finally are substantially the same. Meanwhile, the effective photosensitive areas of different optical fingerprint sensing devices are equal, and accordingly, the equivalent optical absorption rate o of different optical fingerprint sensing devices is equal. Finally, the products of the intensity d of the incident light and the equivalent light absorption rate o of the different optical fingerprint sensing devices are substantially equal to one another. Therefore, it is also ensured that the fingerprint signals received by different optical fingerprint sensing devices may only have a slight difference, and be substantially the same.

In some embodiment, when one optical fingerprint sensing device is disposed in two different light intensity regions, the optical fingerprint sensing device is regarded as being disposed in one of the two light intensity regions where a larger portion of the optical fingerprint sensing device is disposed; and when one optical fingerprint sensing device is disposed in two different light intensity regions, and areas of the optical fingerprint sensing device disposed in the two different light intensity regions are the same, the optical fingerprint sensing device is regarded as being disposed in any one of the two different light intensity regions.

In some embodiment, the corresponding division of the light intensity region with the setting of at least one of the first case and the second case makes the optical fingerprint sensing devices in different positions finally receive roughly the same fingerprint signals, so that the fingerprint signals received by the optical fingerprint sensing devices may only have a slight difference, and be substantially the same, which is beneficial to obtain better fingerprint image quality.

It should be noted that, various embodiments and cases in the disclosure are not mutually antagonistic. Detailed ways of implementing the first case and the second case may be different. That is to say, in order to realize the first case, the structures of FIG. 4 and FIG. 7 in the present disclosure may be adopted, and in order to realize the second case, the structures of FIG. 10 and FIG. 18 in the present disclosure may be adopted. Moreover, in order to realize the first case and the second case at the same time, these top view structures may further be combined. For example, when FIG. 4 and FIG. 10 are combined, the optical fingerprint sensing devices of the same area in FIG. 10 are adjusted to a manner with gradually changed areas as shown in FIG. 4. That is to say, in the present disclosure, content of different embodiments are not mutually exclusive, and various specific operations between different embodiments may be replaced and combined with one another, which are all within the protection scope of the present disclosure, and are not described in detail herein.

Although the present disclosure has been disclosed above with reference to preferred embodiments thereof, it should be understood that the disclosure is presented by way of example only, and not limitation. Those skilled in the art can modify and vary the embodiments without departing from the scope of the present disclosure.

What is claimed is:

1. An optical fingerprint module, comprising:
an optical fingerprint sensor, wherein the optical fingerprint sensor comprises at least one pixel region where photosensitive pixels are disposed, and each of the photosensitive pixels comprises an optical fingerprint sensing device, a non-opaque region and an opaque region, wherein the optical fingerprint sensing device is disposed in the opaque region, and all the optical fingerprint devices are arranged in rows and columns; and
at least one point-shaped backlight source, wherein each of the at least one pixel region corresponds to one of the at least one point-shaped backlight source, and the point-shaped backlight source is disposed obliquely below the optical fingerprint sensing devices in an outermost row of the corresponding pixel region;
wherein in the pixel region, a largest square region whose center is closest to the corresponding point-shaped backlight source is selected, wherein the largest square region comprises 2x×2x pieces of the optical fingerprint sensing devices, or (2x+1)×(2x+1) pieces of the optical fingerprint sensing devices, wherein x is an integer greater than 2;
in the largest square region, two rows and two columns of the optical fingerprint sensing devices farthest from the corresponding point-shaped backlight source are defined as an $x^{th}$ device group, and two rows and two columns of the optical fingerprint sensing devices secondly farthest from the corresponding point-shaped backlight source are defined as an $(x-1)^{th}$ device group, and other optical fingerprint sensing devices in the largest square region are set in a same manner, until the remaining optical fingerprint sensing devices are defined as a first device group; and
the optical fingerprint sensing devices in a $y^{th}$ device group and the optical fingerprint sensing devices in a $(y+1)^{th}$ device group correspond to at least one of the following two cases, wherein y is an integer from 1 to x:
in a first case, an effective photosensitive area of the optical fingerprint sensing devices in the $y^{th}$ device group is smaller than an effective photosensitive area of the optical fingerprint sensing devices in the $(y+1)^{th}$ device group; or
in a second case, an area of the non-opaque region around the optical fingerprint sensing devices in the $y^{th}$ device group is smaller than an area of the non-opaque region around the optical fingerprint sensing devices in the $(y+1)^{th}$ device group.

2. The optical fingerprint module according to claim 1, wherein in the first case, a photosensitive area of the optical fingerprint sensing devices in the $y^{th}$ device group is smaller than a photosensitive area of the optical fingerprint sensing devices in the $(y+1)^{th}$ device group, and the photosensitive area is equal to the effective photosensitive area, so that the effective photosensitive area of the optical fingerprint sensing devices in the $y^{th}$ device group is smaller than the effective photosensitive area of the optical fingerprint sensing devices in the $(y+1)^{th}$ device group.

3. The optical fingerprint module according to claim 1, wherein in the first case, photosensitive areas of the optical fingerprint sensing devices are the same, a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group, so that the effective photosensitive area of the optical fingerprint sensing devices in the $y^{th}$ device group is smaller than the effective photosensitive area of the optical fingerprint sensing devices in the $(y+1)^{th}$ device group.

4. The optical fingerprint module according to claim 1, wherein in the second case, photosensitive areas of the optical fingerprint sensing devices are the same.

5. The optical fingerprint module according to claim 1, wherein in the first case or in a condition in which both the first case and the second case exist, a photosensitive area of the optical fingerprint sensing devices in the $y^{th}$ device group is smaller than a photosensitive area of the optical fingerprint sensing devices in the $(y+1)^{th}$ device group, and a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group.

6. The optical fingerprint module according to claim 1, wherein in the pixel region, there are remaining A rows of the optical fingerprint sensing devices disposed outside the largest square region, wherein A is an integer greater than 1; in the A rows of the optical fingerprint sensing devices, a row of the optical fingerprint sensing devices closet to the point-shaped backlight source is defined as an $(x+1)^{th}$ device group, and other optical fingerprint sensing devices in the remaining A rows are set in a same manner, until a row of the optical fingerprint sensing device farthest from the point-shaped backlight source are defined as an $(x+a)^{th}$ device group;

or, in the pixel region, there are remaining 2A columns of the optical fingerprint sensing devices symmetrically disposed on both sides of the largest square region, wherein A is an integer greater than 1; in the 2A columns of the optical fingerprint sensing devices, two columns of the optical fingerprint sensing devices closest to the point-shaped backlight source are defined as an $(x+1)^{th}$ device group, and other optical fingerprint sensing devices in the remaining 2A columns are set in a same manner, until two columns of the optical fingerprint sensing devices farthest from the point-shaped backlight source are defined as an $(x+a)^{th}$ device group; and the optical fingerprint sensing devices in the $z^{th}$ device group and the optical fingerprint sensing devices in the $(z+1)^{th}$ device group correspond to at least one of the following two cases, wherein z is an integer from x to x+a:

in the first case, an effective photosensitive area of the optical fingerprint sensing devices in the $z^{th}$ device group is smaller than an effective photosensitive area of the optical fingerprint sensing devices in the $(z+1)^{th}$ device group;

in the second case, an area of the non-opaque region around the optical fingerprint sensing devices in the $z^{th}$ device group is smaller than an area of the non-opaque region around the optical fingerprint sensing devices in the $(z+1)^{th}$ device group.

7. An optical fingerprint module comprising:

an optical fingerprint sensor, wherein the optical fingerprint sensor comprises at least one pixel region where photosensitive pixels are disposed, and each of the photosensitive pixels comprises an optical fingerprint sensing device, a non-opaque region and an opaque region, wherein the optical fingerprint sensing device is disposed in the opaque region, and all the optical fingerprint devices are arranged in rows and columns; and at least one point-shaped backlight source, wherein each of the at least one pixel region corresponds to one of the at least one point-shaped backlight source, and the point-shaped backlight source is disposed obliquely below the optical fingerprint sensing devices in an outermost row of the corresponding pixel region;

wherein in the pixel region, a largest rectangular region whose center is closest to the corresponding point-shaped backlight source is selected, wherein the largest rectangular region comprises x×(2x−1) pieces of the optical fingerprint sensing devices with a form of x rows and (2x−1) columns, or comprises x×2x pieces of the optical fingerprint sensing devices with a form of x rows and (2x−1), wherein x is an integer greater than 2;

in the largest rectangular region, one row and two columns of the optical fingerprint sensing devices farthest from the corresponding point-shaped backlight source are defined as an $x^{th}$ device group, and one row and two columns of the optical fingerprint sensing devices secondly farthest from the corresponding point-shaped backlight source are defined as an $(x-1)^{th}$ device group, and other optical fingerprint sensing devices in the largest square region are set in a same manner, until the remaining optical fingerprint sensing devices are defined as a first device group; and the optical fingerprint sensing devices in a $y^{th}$ device group and the optical fingerprint sensing devices in a $(y+1)^{th}$ device group correspond to at least one of the following two cases, wherein y is an integer from 1 to x:

in a first case, an effective photosensitive area of the optical fingerprint sensing devices in the $y^{th}$ device group is smaller than an effective photosensitive area of the optical fingerprint sensing devices in the $(y+1)^{th}$ device group; or in a second case, an area of the non-opaque region around the optical fingerprint sensing devices in the $y^{th}$ device group is smaller than an area of the non-opaque region around the optical fingerprint sensing devices in the $(y+1)^{th}$ device group.

8. The optical fingerprint module according to claim 7, wherein in the first case, a photosensitive area of the optical fingerprint sensing devices in the $y^{th}$ device group is smaller than a photosensitive area of the optical fingerprint sensing devices in the $(y+1)^{th}$ device group, and the photosensitive area is equal to the effective photosensitive area, so that the effective photosensitive area of the optical fingerprint sensing devices in the $y^{th}$ device group is smaller than the effective photosensitive area of the optical fingerprint sensing devices in the $(y+1)^{th}$ device group.

9. The optical fingerprint module according to claim 7, wherein in the first case, photosensitive areas of the optical fingerprint sensing devices are the same, a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group, so that the effective photosensitive area of the optical fingerprint sensing devices in the $y^{th}$ device group is smaller than the effective photosensitive area of the optical fingerprint sensing devices in the $(y+1)^{th}$ device group.

10. The optical fingerprint module according to claim 7, wherein in the second case, photosensitive areas of the optical fingerprint sensing devices are the same.

11. The optical fingerprint module according to claim 7, wherein in the first case or in a condition in which both the first case and the second case exist, a photosensitive area of the optical fingerprint sensing devices in the $y^{th}$ device group is smaller than a photosensitive area of the optical fingerprint sensing devices in the $(y+1)^{th}$ device group, and a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group.

12. The optical fingerprint module according to claim 7, wherein in the pixel region, there are remaining A rows of the optical fingerprint sensing devices disposed outside the largest rectangular region, wherein A is an integer greater than 1; in the A rows of the optical fingerprint sensing devices, a row of the optical fingerprint sensing devices closet to the point-shaped backlight source is defined as an $(x+1)^{th}$ device group, and other optical fingerprint sensing devices in the remaining A rows are set in a same manner, until a row of the optical fingerprint sensing device farthest from the point-shaped backlight source are defined as an $(x+a)^{th}$ device group;

or, in the pixel region, there are remaining 2A columns of the optical fingerprint sensing devices symmetrically disposed on both sides of the largest rectangular region, wherein A is an integer greater than 1; in the 2A columns of the optical fingerprint sensing devices, two columns of the optical fingerprint sensing devices closest to the point-shaped backlight source are defined as an $(x+1)^{th}$ device group, and other optical fingerprint sensing devices in the remaining 2A columns are set in a same manner, until two columns of the optical fingerprint sensing devices farthest from the point-shaped backlight source are defined as an $(x+a)^{th}$ device group; and the optical fingerprint sensing devices in the $z^{th}$ device group and the optical fingerprint sensing devices in the $(z+1)^{th}$ device group correspond to at least one of the following two cases, wherein z is an integer from x to x+a:

in the first case, an effective photosensitive area of the optical fingerprint sensing devices in the $z^{th}$ device group is smaller than an effective photosensitive area of the optical fingerprint sensing devices in the $(z+1)^{th}$ device group;

in the second case, an area of the non-opaque region around the optical fingerprint sensing devices in the $z^{th}$ device group is smaller than an area of the non-opaque region around the optical fingerprint sensing devices in the $(z+1)^{th}$ device group.

13. An optical fingerprint module comprising:
an optical fingerprint sensor, wherein the optical fingerprint sensor comprises at least one pixel region where photosensitive pixels are disposed, and each of the photosensitive pixels comprises an optical fingerprint sensing device, a non-opaque region and an opaque region, wherein the optical fingerprint sensing device is disposed in the opaque region; and
a point-shaped backlight source, wherein one of the pixel region corresponds to one of the point-shaped backlight sources; the point-shaped backlight source is obliquely below the corresponding pixel region;
wherein the pixel region is divided into a plurality of light intensity regions sequentially from a first light intensity region to an $x^{th}$ light intensity region according to a distance relative to the corresponding point-shaped backlight source, from a shortest distance to a longest distance, wherein a whole shape of a second light intensity region to an $(x-1)^{th}$ light intensity region presents an arc-shaped bar or an elliptical arc-shaped bar, wherein x is an integer greater than 3; and
the optical fingerprint sensing devices in the first light intensity region are defined as a first device group and the optical fingerprint sensing devices in the second light intensity region are defined as a second device group, and the optical fingerprint sensing devices in the $x^{th}$ light intensity region are defined as an $x^{th}$ device group; and
the optical fingerprint sensing devices in the $y^{th}$ device group and the optical fingerprint sensing devices in the $(y+1)^{th}$ device group correspond to at least one of the following two cases, wherein y is an integer from 1 to x:
in a first case, an effective photosensitive area of the optical fingerprint sensing devices in the $y^{th}$ device group is smaller than an effective photosensitive area of the optical fingerprint sensing devices in the $(y+1)^{th}$ device group; or
in a second case, an area of the non-opaque region around the optical fingerprint sensing devices in the $y^{th}$ device group is smaller than an area of the non-opaque region around the optical fingerprint sensing devices in the $(y+1)^{th}$ device group.

14. The optical fingerprint module according to claim 13, wherein in the first case, a photosensitive area of the optical fingerprint sensing devices in the $y^{th}$ device group is smaller than a photosensitive area of the optical fingerprint sensing devices in the $(y+1)^{th}$ device group, and the photosensitive area is equal to the effective photosensitive area, so that the effective photosensitive area of the optical fingerprint sensing devices in the $y^{th}$ device group is smaller than the effective photosensitive area of the optical fingerprint sensing devices in the $(y+1)^{th}$ device group.

15. The optical fingerprint module according to claim 13, wherein in the first case, all photosensitive areas of the optical fingerprint sensing devices are the same, and the optical fingerprint sensing device has a light blocking layer above, and the light blocking layer has an opening for exposing a surface of the optical fingerprint sensing device; an area of opening of the light blocking layer above the optical fingerprint sensing devices in the $y^{th}$ device group is smaller than an area of opening of the light blocking layer above the optical fingerprint sensing devices in the $(y+1)^{th}$ device group, so that the effective photosensitive area of the optical fingerprint sensing devices in the $y^{th}$ device group is smaller than the effective photosensitive area of the optical fingerprint sensing devices in the $(y+1)^{th}$ device group.

16. The optical fingerprint module according to claim 13, wherein in the second case, photosensitive areas of the optical fingerprint sensing devices are the same.

17. The optical fingerprint module according to claim 13, wherein in the first case or in a condition in which both the first case and the second case exist, a photosensitive area of the optical fingerprint sensing devices in the $y^{th}$ device group is smaller than a photosensitive area of the optical fingerprint sensing devices in the $(y+1)^{th}$ device group, and a light blocking layer is disposed above the optical fingerprint sensing devices, and the light blocking layer has an opening for exposing a surface of the optical fingerprint sensing devices; an area of the opening of the light blocking layer above the optical fingerprint sensing devices in the $y^{th}$ device group is smaller than an area of the opening of the light blocking layer above the optical fingerprint sensing devices in the $(y+1)^{th}$ device group.

18. The optical fingerprint module according to claim 13, wherein when one optical fingerprint sensing device is disposed in two different light intensity regions, the optical fingerprint sensing device is regarded as being disposed in one of the two light intensity regions where a larger portion of the optical fingerprint sensing device is disposed; and when one optical fingerprint sensing device is disposed in two different light intensity regions, and areas of the optical fingerprint sensing device disposed in the two different light intensity regions are the same, the optical fingerprint sensing device is regarded as being disposed in any one of the two different light intensity regions.

* * * * *